(12) United States Patent
Bitar et al.

(10) Patent No.: US 6,418,460 B1
(45) Date of Patent: *Jul. 9, 2002

(54) SYSTEM AND METHOD FOR FINDING PREEMPTED THREADS IN A MULTI-THREADED APPLICATION

(75) Inventors: Nawaf K. Bitar, San Jose; Robert M. English, Menlo Park; Rajagopal Ananthanarayanan, Sunnyvale, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/802,802

(22) Filed: Feb. 18, 1997

(51) Int. Cl.[7] .................................................. G06F 9/00

(52) U.S. Cl. ........................................ 709/108; 712/233

(58) Field of Search .................................... 395/733, 674, 395/726, 670, 200.3, 800.01; 709/100, 101, 102, 103, 104, 105, 106, 107, 108

(56) References Cited

U.S. PATENT DOCUMENTS

| | | | | |
|---|---|---|---|---|
| 4,901,231 A | * | 2/1990 | Bishop | 364/200 |
| 5,339,415 A | * | 8/1994 | Strout et al. | 395/650 |
| 5,515,538 A | * | 5/1996 | Kleiman | 395/733 |
| 5,524,247 A | * | 6/1996 | Mizuno | 395/726 |
| 5,717,926 A | * | 2/1998 | Browning et al. | 395/674 |
| 5,872,963 A | * | 2/1999 | Bitar | 712/233 |

OTHER PUBLICATIONS

"Microsoft Press computer dictionary : the comprehensive standard for business, school, library, and home" Microsoft Press.—2nd ed. p. 60, 1994.*

Polychronopoulos, C., et al., "nano–Threads: A User–Level Threads Architecture", *Technical Report #1295*, Center for Supercomputing Research and Development, Univ. of Illinois, 2–22.

Polychronopoulos, C.D., "Auto Scheduling: Control Flow and Data Flow Come Together", *Technical Report*, Center for Supercomputing Research and Development, Univ. of Illinois, 1–28, (Dec. 1990).

Anderson, T., et al., "The Performance Implications of Thread Management Alternatives for Shared–Memory Multiprocessors", *IEEE Trans. on Computers*, 38, 1631–1644, (Dec. 1989).

Black, D., "Scheduling Support for Concurrency and Parallelism in the Mach Operating System", *Computer*, 23, 35–43, (May 1990).

(List continued on next page.)

*Primary Examiner*—Majid Bononuhah
(74) *Attorney, Agent, or Firm*—Schwegman, Lundberg, Woessner & Kluth, P.A.

(57) ABSTRACT

A system and method for inexpensively detecting preempted execution entities such as threads without kernel involvement. In a computer system having a memory and one or more processors, a shared memory arena is formed in user space within the memory. A preempt bit vector is then formed within the shared memory arena such that the preempt bit vector is accessible to any of a plurality of execution entities running in user mode. The preempt bit vector includes a plurality of rbits, wherein each rbit is associated with one of the plurality of execution entities and wherein an rbit is marked whenever its associated execution entity is preempted. Detection of preempted threads then becomes a matter of reading, via program code executing in user mode on one of the plurality of processors, bits in the preempt bit vector to detect preempted execution entities.

21 Claims, 17 Drawing Sheets

OTHER PUBLICATIONS

Callahan, D., et al., "A Future–based Parallel Language for a General–purpose Highly–parallel Computer", *In: Languages and Compilers for Parallel Computing*, David Gelernter, et al., eds., MIT Press, Cambridge, MA, 95–113, (1989).

Dimpsey, R., et al., "Performance Degradation Due to Multiprogramming and System Overheads in Real Workloads: Case Study on a Shared Memory Multiprocessor", *1990 International Conf. on Supercomputing*, ACM Press, 227–238, (Jun. 11–15, 1990).

Draves, R., et al., "Using Continuations to Implement Thread Management and Communication in Operating Systems", *Operating Systems Review*, 25, ACM Press, 122–136, (Oct. 1991).

Eager, D., et al., "Chores: Enhanced Run–Time Support for Shared–Memory Parallel Computing", *ACM Trans. on Computer Systems*, 11, 1–32, (Feb. 1993).

Girkar, M., et al., "Automatic Extraction of Functional Parallelism from Ordinary Programs", *IEEE Trans. on Parallel and Distributed Systems*, 3, 166–178, (Mar. 1992).

Lo, S., et al., "A Comparative Analysis of Multiprocessor Scheduling Algorithms", *IEEE : 7th International Conf. on Distributed Computing Systems*, Berlin, Germany, 356–363, (Sep. 21–25, 1987).

Polychronopoulos, C., "Multiprocessing versus Multiprogramming", *Proc. : 1989 International Conf. on Parallel Processing*, II–223 to II–230, (Aug. 8–12, 1989).

Scott, M., et al., "Multi–Model Parallel Programming in Psyche", *Sigplan Notices*, 25, ACM Press, 70–78, (Mar. 1990).

Tucker, A., et al., "Process Control and Scheduling Issues for Multiprogrammed Shared–Memory Multiprocessors", *Proc.: 12th ACM Symp. on Operating Systems Principles*, 23, Litchfield Park, Arizona, 159–166, (Dec. 3–6, 1989).

Vandevoorde, M., et al., "WorkCrews: An Abstraction for Controlling Parallelism", *International J. Parallel Programming*, 17, 347–366, (1988).

Zahorjan, J., et al., "Processor Scheduling in Shared Memory Multiprocessors", *Proc. 1990 Conf. on Measurement & Modeling of Computer Systems*, Boulder, CO, 214–225, (May 22–25, 1990).

Zahorjan, J., et al., "The Effect of Scheduling Discipline on Spin Overhead in Shared Memory Parallel Systems", *IEEE Trans. on Parallel and Distributed Systems*, 2, 180–198, (Apr. 1991).

\* cited by examiner

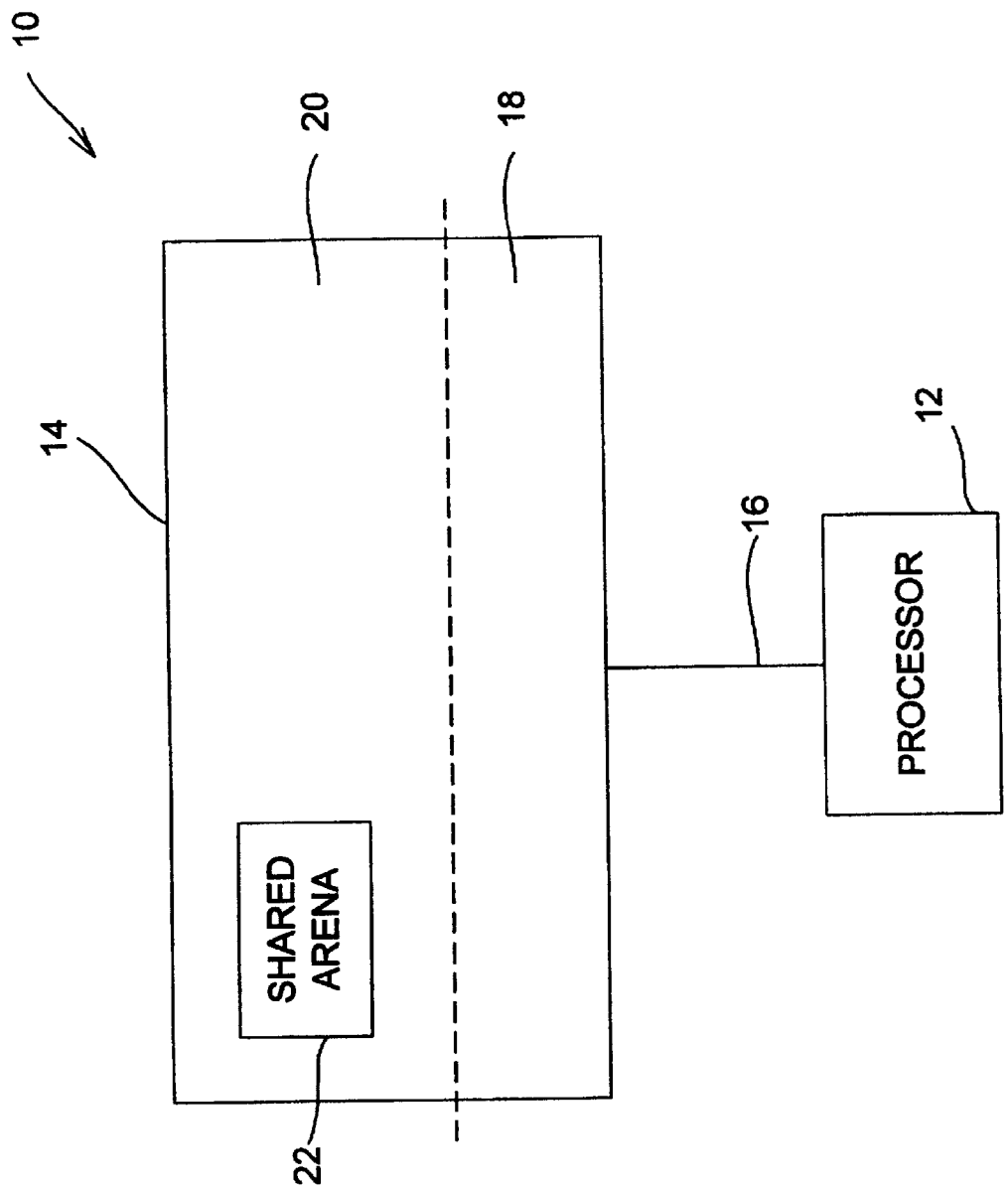

SYSTEM AND METHOD FOR FINDING PREEMPTED THREADS IN A MULTI-THREADED APPLICATION

BACKGROUND OF THE INVENTION

1. Field of the Invention

The present invention relates to a system and method of scheduling parallel processes in a multiprocessor system, and more particularly to a system and method for finding preempted threads in a multi-threaded application.

2. Background Information

A thread model of program execution has proven to be a viable method for parallel execution of program code both in single and multiprocessor machines. Under the thread model, programs are partitioned (by the user or by a compiler) into a set of parallel activities. The instantiation of each activity during execution of the program code is called a thread; if the program code includes more than one thread, the program is said to be multi-threaded. By partitioning the program code into threads, it is possible to create a more easily maintainable, more easily understood and, possibly, faster program.

The thread abstraction described above is often referred to as a user-level thread. It is the entity that a user will create, using a threads interface, in order to express parallelism in a program. The operating system will provide a unit of scheduling, a virtual processor, to which a user-level thread will be mapped; the mapping may be performed statically, or dynamically when executing. This virtual processor will in turn be mapped to a physical processor by the operating system scheduler. Conceptually, it is useful to distinguish the user-level thread from the virtual processor.

A virtual processor may be a process, such as that provided by traditional UNIX systems, a kernel thread, such as that provided by Mach, or some other abstraction. It is the definition of the virtual processor and the related mapping of user-level threads to virtual processors that defines the performance characteristics of a threads implementation.

There are three basic architectures (and a few variants) that merit discussion:

Many-to-one—The name refers to the mapping of many user-level threads to a single virtual processor. User-level threads mapped to a single virtual processor are also called coroutines.

One-to-one—This architecture maps a single user-level thread to a single virtual processor.

Many-to-many—Typically, multiple user-level threads are mapped to a smaller number of virtual processors. This multiplexing of user-level threads to virtual processors is performed by a second level scheduler within the threads library.

Virtual Processors

Every operating system exports an abstraction that represents the basic unit of scheduling. Under UNIX, for example, the process is the fundamental abstraction that is scheduled; under Mach the kernel thread is the equivalent entity. This abstraction, a virtual processor, is scheduled by the operating system scheduler for execution on available physical processors. It is called a virtual processor because an application may treat it as a processing resource independent of whether it is "backed" by a physical processor.

A traditional UNIX process cannot execute in parallel on a multiprocessor precisely because a virtual processor is a process (a single virtual processor can only be scheduled onto a single physical processor); multiple processes can run concurrently, but if there is only a single runnable process all the processors but one will be idle. A Mach process having multiple kernel threads can run concurrently on multiple processors since the virtual processor is a kernel thread and the process may be comprised of multiple kernel threads.

Many-to-one

Until recently there has not been widespread operating system support for threads. In order to more naturally express concurrency in applications, libraries have been built that support lightweight user-level threads without the benefit of operating system support. While these systems do not allow for parallel execution on multiprocessor hardware, they do allow a programmer to structure an application in a fashion that expresses an application's natural concurrency. Such libraries are examples of the many-to-one model. Multiple user-level threads are multiplexed onto a single virtual processor such as a UNIX process.

The most significant disadvantage of this approach is that it does not allow a single multi-threaded process to take advantage of multiprocessor hardware because there is only one operating-system-visible virtual processor for the entire program. Another disadvantage is that an executing thread will run until either the process's time quantum expires or the thread voluntarily yields the processor. If the running thread blocks for any reason, such as waiting for an I/O request to complete, all the other threads in the process will also be blocked pending completion of the wait, despite the fact that they are independent of the thread awaiting service. Again this is a direct result of having only one virtual processor per program.

It is worth noting that this problem can be ameliorated by the judicious use of alarm signals. Alarm notifications can be scheduled by the threads library such that on delivery of an alarm signal the threads library regains control. It can then choose to schedule an alternate thread for some period of time up to the balance of the process's time quantum.

This architecture is illustrated in FIG. 1a. It depicts three UNIX processes, with each process having one or more threads 2 and each process being allocated a UNIX address space 3. (In the system shown in FIG. 1a, two of the processes are multi-threaded and the other is single-threaded.) Note that each process, multi-threaded or not, is mapped onto a single process 4 and thus will never utilize more than a single processor at any instance of time. Despite these disadvantages, this model achieved considerable popularity for three main reasons:

Operating systems had not provided any means for expressing concurrency in a program.

The user-level threads are lightweight because the management operations are implemented as procedure calls that do not involve the operating system kernel.

This style of threads library is easy to implement as it requires no operating system modifications.

Examples of this style of architecture are Sun's Light-Weight Process library in versions of SunOS prior to 5.0, Apollo's Concurrent Programming Support library in Domain/OS and early versions of Digital's Concert Multi-threaded Architecture package.

One-to-one

The one-to-one model represents the simplest form of operating system support for multiple threads of control. It derives its name from the mapping of a user-level thread 2 to a kernel-level thread 5, the virtual processor in this case, as shown in FIG. 1b. The operating system implements kernel threads as the independently schedulable entities. The creation of a user-level thread results in the creation of a kernel-level thread. The operating system then schedules these kernel threads onto processors and thus effectively schedules the corresponding user-level threads.

There are two significant advantages to this model. It is a simple architecture in that a traditional process scheduler merely has to redefine a virtual processor to be a kernel thread instead of a process. Furthermore, all the scheduling takes place at the kernel level—there is no scheduling of user-level threads and thus no associated complexity. The second and most significant advantage is the potential for a single application to achieve true concurrency on multiprocessor hardware. Multiple virtual processors, possibly from the same process, can be scheduled onto multiple physical processors. Thus, the user-level threads, corresponding to the kernel-level threads that are executing on these physical processors, are executing in parallel. In addition, if a user-level thread blocks while executing a system call, for example a read from a terminal, the corresponding kernel-level thread will block in the kernel; any other user-level threads within the application, however, are not prevented from executing because each of them is associated with a kernel thread that may be independently scheduled.

There are a few disadvantages, however. As already discussed, each user-level thread results in the creation of a kernel-level thread. These kernel-level threads require system resources. In particular, each kernel thread has an associated kernel stack and some additional kernel state. These are typically wired in memory—they consume physical memory and are not subject to pageout. Clearly, this characteristic places a limit, that scales with the size of physical memory, on the number of user-level threads that can exist in the system; and applications, such as window systems, that use a large number of threads will consume significant kernel resources.

The inherent kernel implementation of this architecture results in an additional disadvantage. Most thread management routines result in a trap into the kernel which is an expensive operation: the user-kernel protection boundary must be crossed and the routine's arguments have to be copied onto the supervisor stack and verified.

This architecture is implemented in the OSF/1 and Mach 2.5 operating systems.

Variable-weight Processes

Variable-weight processes are a variant of the one-to-one threads architecture. They are implemented in some UNIX systems, most notably those of Silicon Graphics Inc. and Encore Computer Corporation. In a system that supports variable-weight processes the virtual processor is defined to be a process as in a traditional UNIX system. One example of such a system is illustrated in FIG. 1c, where user level threads 6 are mapped onto variable-weight processes 4. Proponents of the variable-weight process model argue that it is unnecessary to radically restructure a UNIX kernel in order to implement a new schedulable entity such as a kernel thread.

In order to achieve the same performance characteristics of traditional threads models variable-weight processes must share state. Such processes derive their name from the ability to share arbitrary state as specified by a programmer. An increase in shared state results in faster operations, such as context switch and process creation, and further results in a lighter-weight entity. The state to be shared is indicated by the programmer at process creation time by passing a resource descriptor to the create call; this descriptor specifies the exact sharing relationships. After the call to create, some state will be shared by the child process with the parent—the remaining state will have been copied from the parent. Note that address space 3 is almost always shared (and is depicted so in FIG. 1c).

The most significant advantage of this model is its natural UNIX implementation. UNIX semantics that are difficult to define in a multi-threaded process, such as those of signals and fork, are easily defined in a system that provides parallelism through variable-weight processes (a variable-weight process is merely a UNIX process that happens to share some of its state). In addition, a variable-weight process implementation requires significantly less implementation effort than a kernel threads model. Finally, this model provides remarkable flexibility in the configuration of the shared resources of a process.

There are, however, a number of significant disadvantages. Since this is a variant of the one-to-one model it shares the disadvantages of that model, namely expensive operations and excessive resource consumption. A more important disadvantage stems from its programmer-unfriendly nature. In particular, it is easy to specify sharing models that are at best confused and at worst contradictory across several processes. Finally, each variable-weight process has its own UNIX process identifier which is exported to the user. This is a serious flaw: it is preferable that a user not be able to infer information about individual threads within a single application. In particular, operations that manipulate an entire process under a traditional threads model may only affect the single variable-weight process that is the target of the operation possibly resulting in unexpected behavior. In short, variable-weight processes cannot be treated as user-level threads without careful forethought.

Many-to-many

This model seeks to combine the advantages of the many-to-one and one-to-one architectures while avoiding the disadvantages of both those architectures. This is achieved by multiplexing user-level threads onto a smaller number of virtual processors, often kernel-level threads. The architecture is typically implemented by building a user-level scheduler that manages the switching of the user-level threads onto the kernel-level threads. A kernel scheduler is then responsible for scheduling the virtual processors onto physical processors. Hence, in addition to being called many-to-many (from the multiplexing), this model is also called a multiplexed threads model or two-level scheduling model. One example of such a system is illustrated in FIG. 1d.

As a result of this multiplexing, this architecture has the advantages of the many-to-one model and the advantages of the one-to-one model: management (context switch, creation, etc.) of the user-level threads is inexpensive (providing a trap into the kernel is not necessary—this happens less frequently than in the one-to-one model) and multiple virtual processors provide for simultaneously executing instruction streams within a single application. Furthermore, since this model uses a limited number of virtual processors there is no prohibitive consumption of kernel resources. The primary disadvantage of this architecture is the complexity introduced by an additional scheduling level. While the kernel maintains its traditional responsibility of scheduling virtual processors onto physical processors, the threads library now has to schedule user-level threads onto virtual processors.

Scheduler Activations

An extension to the many-to-many model provides for more communication between the operating system scheduler and the user-level scheduler. The basic premise behind this model is that the operating system scheduler does not have sufficient information about each individual application to make "good" scheduling decisions for all of them. Also, the user-level scheduler does not have sufficient information from the kernel to make the scheduling decisions itself: for example, a page fault is transparent to the user-level scheduler.

The fundamental extension introduced in scheduler activations is a set of upcalls; these occur on certain operating system events such as page faults, processor allocation, and processor preemption. The upcalls activate the user-level scheduler allowing it to make a scheduling decision. Clearly, in order to be useful, a user-level scheduler needs to track which user-level threads are running on which virtual processors. In the case of a blocking page fault, the user-level scheduler can, on notification via upcall, schedule an alternative thread onto its now available processor.

The disadvantages of this model are that it introduces additional complexity and sometimes results in the unnecessary preemption of a user-level thread; the additional preemption is required in order to acquire a virtual processor with which to perform an upcall.

Compiler-driven Scheduling

Recognizing that even a sophisticated user-level scheduler can only have a limited understanding of an application's topology, this model causes scheduling to occur via code injected into an application's binary by the compiler. The premise is that the compiler will have a full understanding of the application's topology following a sophisticated control and data dependence analysis and consequently can make better scheduling decisions.

Problems with the Above Approaches

Each of the above approaches suffer from high overhead associated with tracking and restarting preempted threads. This problem is exacerbated in multiprocessor systems as more than one processor, for example, may be spinning idly while waiting for results from a preempted thread.

What is needed is an easily accessible, centralized preemption detection mechanism which can be used in either single or multiprocessor systems to detect preempted execution entities such as threads.

SUMMARY OF THE INVENTION

The present invention provides a system and method for inexpensively detecting preempted execution entities such as threads without kernel involvement. In a computer system having a memory and one or more processors, a shared memory arena is formed in user space within the memory. A preempt bit vector is then formed within the shared memory arena such that the preempt bit vector is accessible to any of a plurality of execution entities running in user mode. The preempt bit vector includes a plurality of rbits, wherein each rbit is associated with one of the plurality of execution entities and wherein an rbit is marked whenever its associated execution entity is preempted. Detection of preempted threads then becomes a matter of reading, via program code executing in user mode on one of the plurality of processors, bits in the preempt bit vector to detect preempted execution entities.

According to another aspect of the present invention, processors are assigned to separate operating system kernels, with a preempt bit vector formed in shared memory accessible to each kernel used to track preempted execution entities.

BRIEF DESCRIPTION OF THE DRAWINGS

In the drawings, where like numerals refer to like components throughout the several views.

FIGS. 2a through 2d are block diagrams of systems for executing multi-threaded programs;

FIG. 3 illustrates a nanothreaded application's address space running on a computing system such as that shown in FIG. 2a;

DESCRIPTION OF THE PREFERRED EMBODIMENTS

In the following detailed description of the preferred embodiments, references made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical, physical, architectural, and electrical changes may be made without departing from the spirit and scope of the present invention. The following detailed description is, therefore, not to be taken in a limiting sense, and the scope of the present invention is defined only by the appended claims and their equivalents.

Figure 1A:
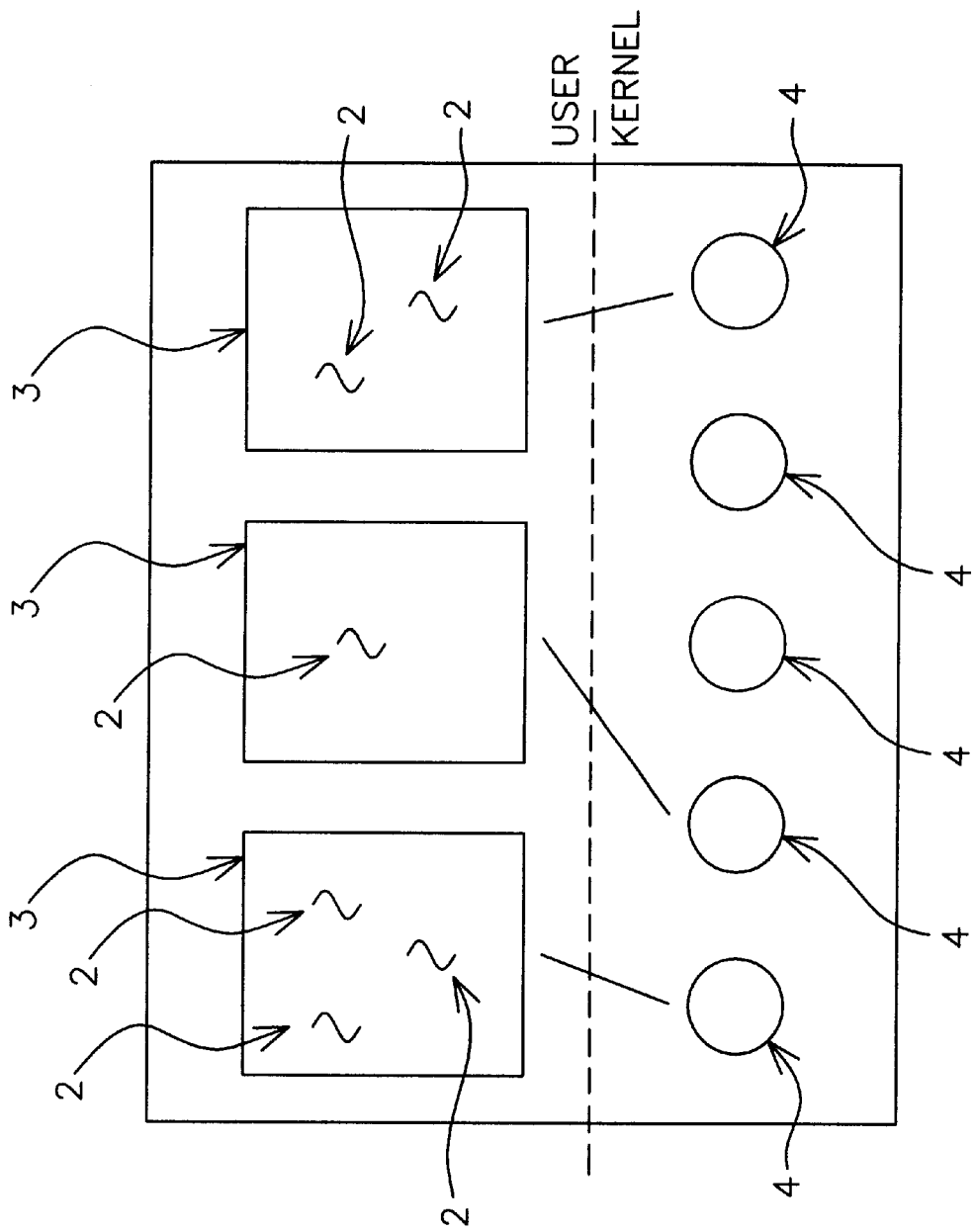
FIGS. 1a through 1d show thread models used to map threads onto virtual processors.
Figure 1B:
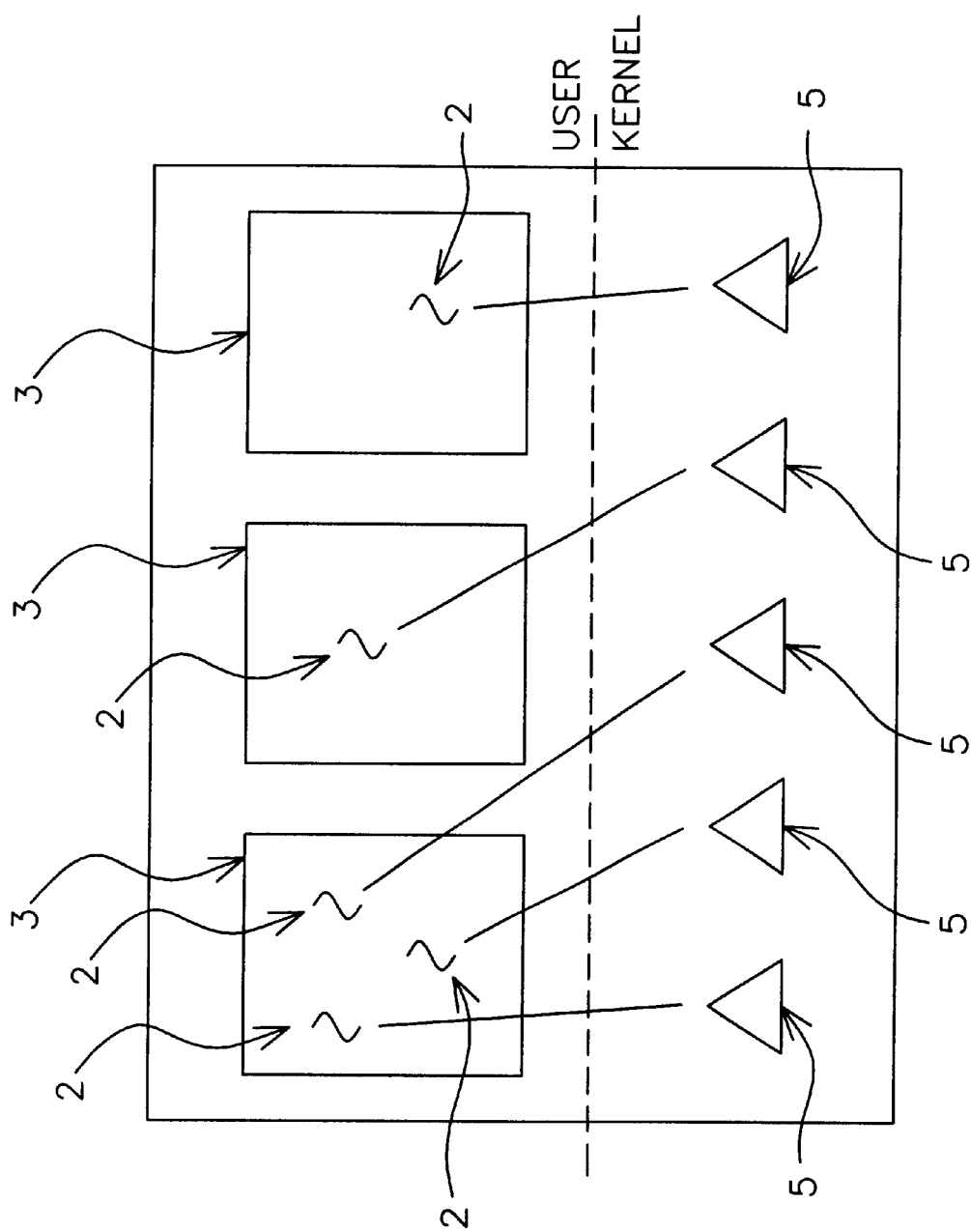
Figure 1C:
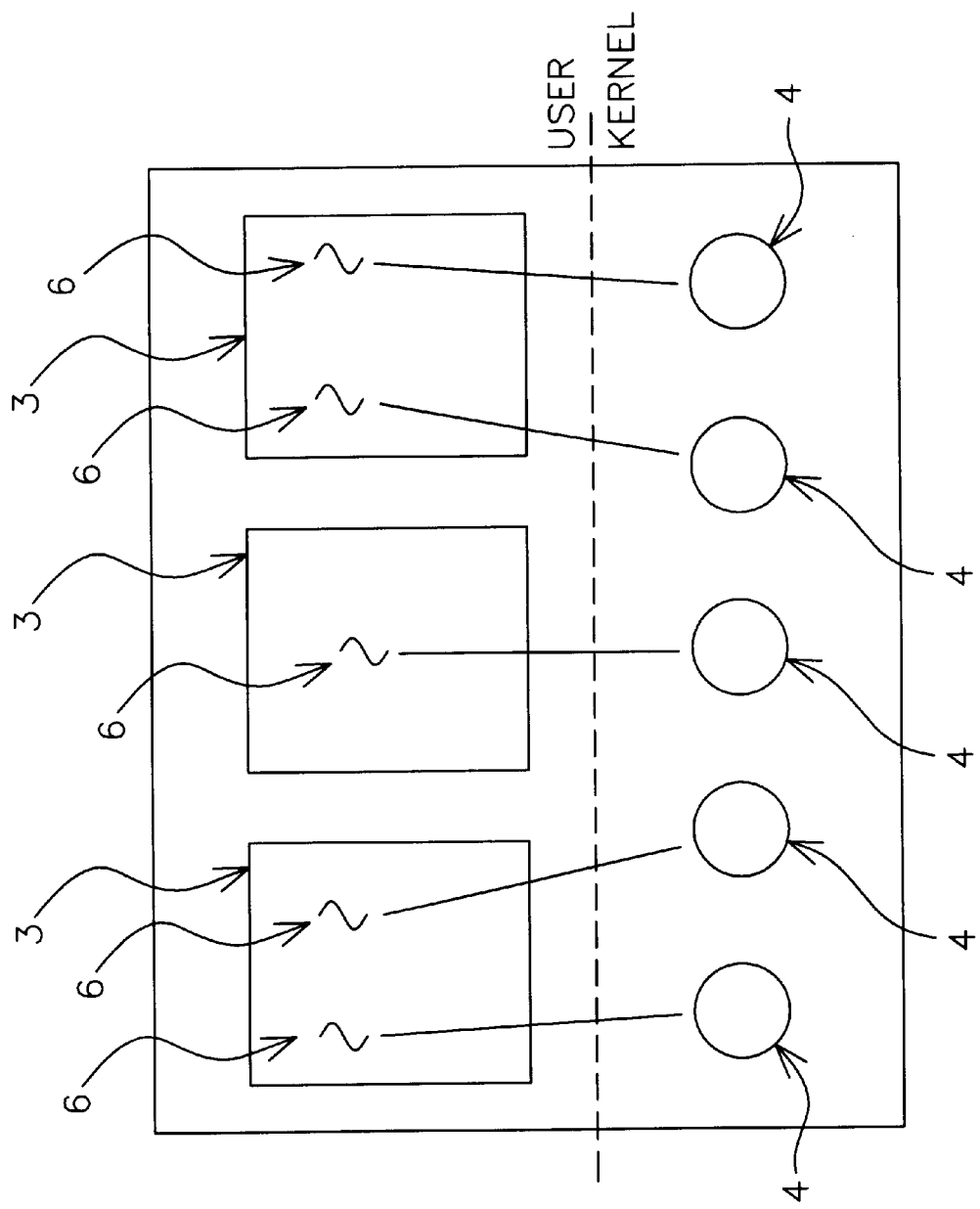
Figure 1D:
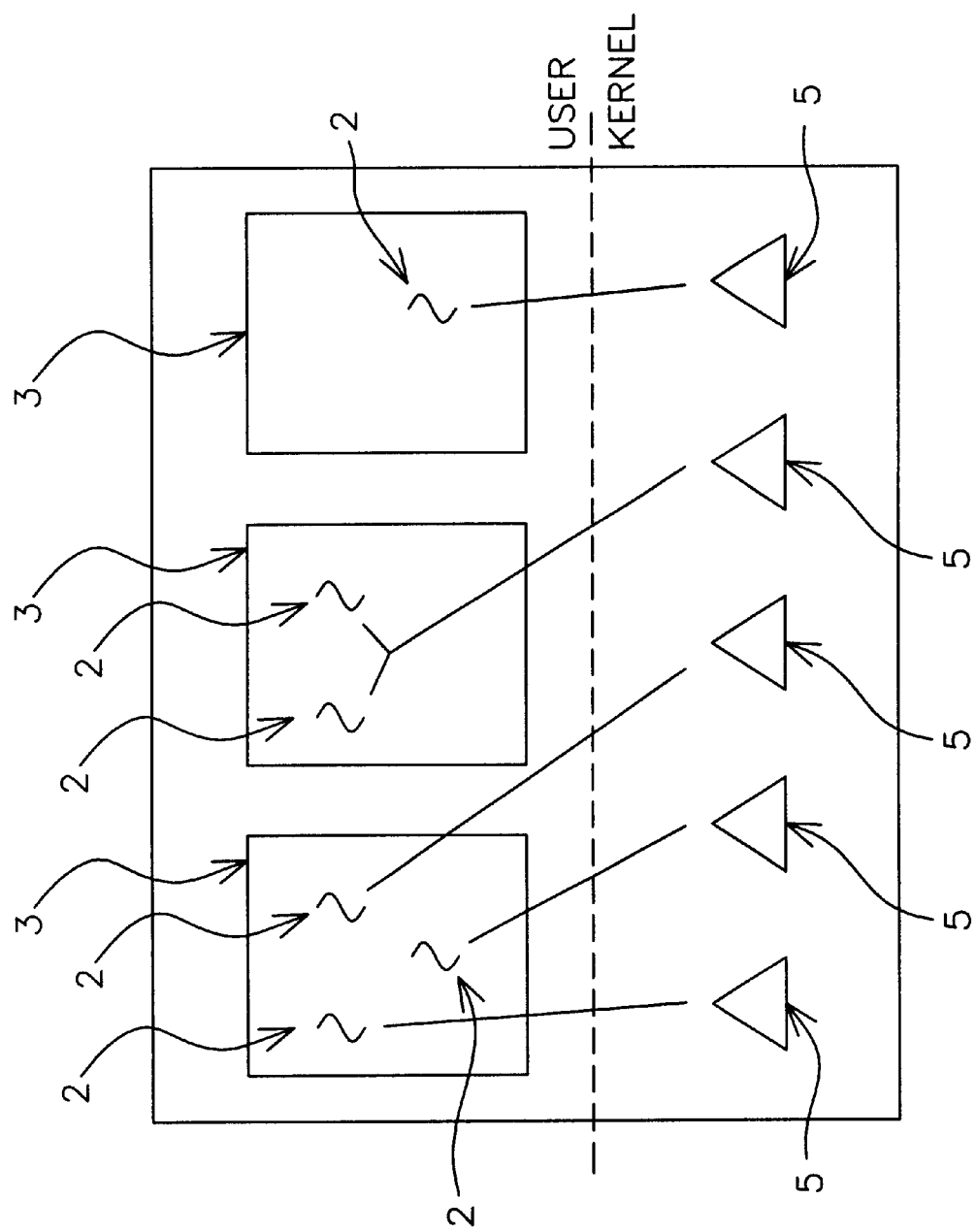
Figure 2B:
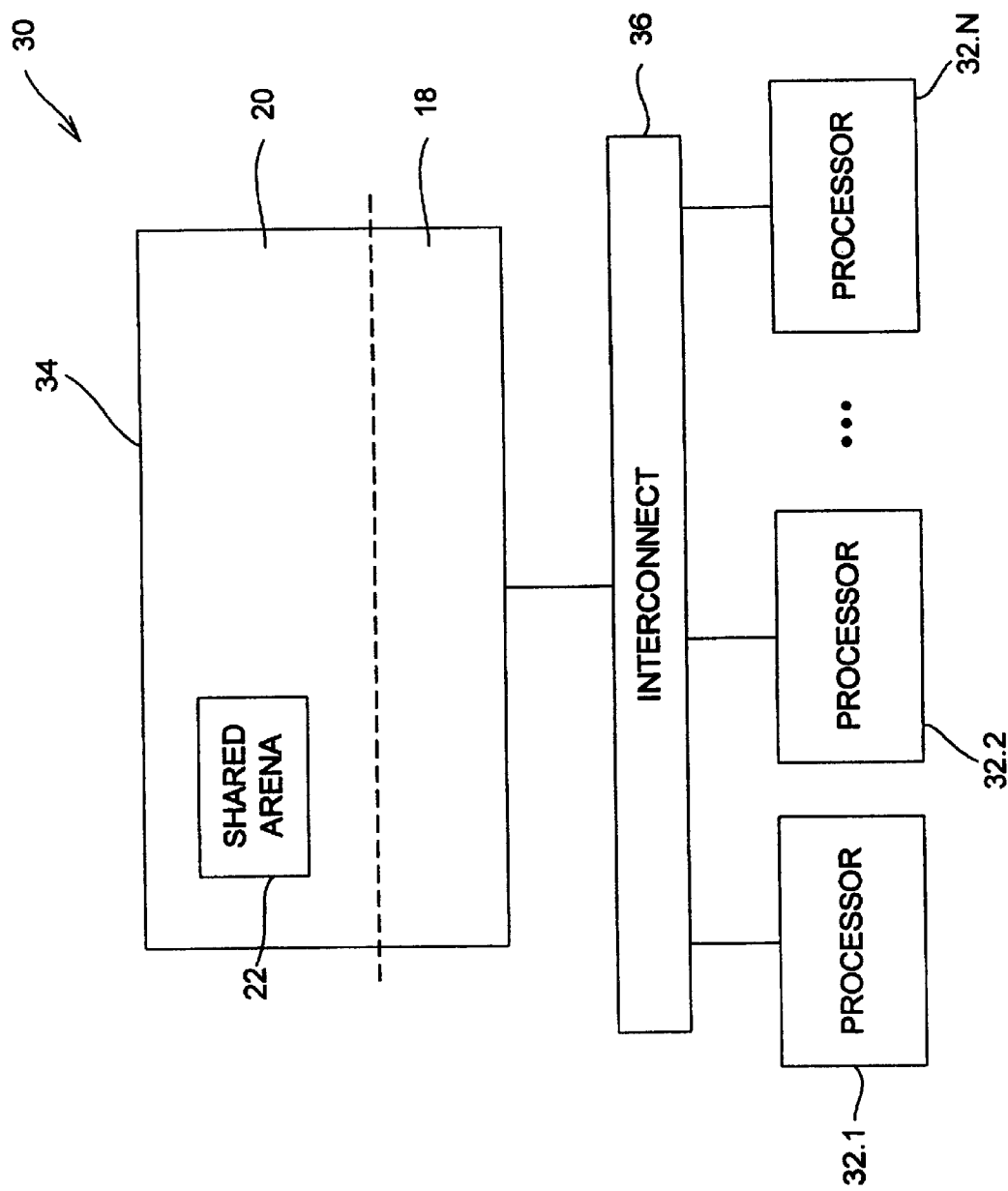

Systems for executing multi-threaded programs are shown in FIGS. 2a through 2d. In FIG. 2a, computing system 10 includes a processor 12 connected to a memory 14 over an interconnect 16. Memory 14 includes a kernel space 18 and a user space 20. User space 20 includes a shared arena per application as will be discussed below.

In FIG. 2b, computing system 30 is a shared memory system having a plurality N of processors 32.1 through 32.N connected over an interconnect 36 to a shared memory 34. Shared memory 34 includes a kernel space 18 and a user space 20. Once again, user space 20 includes a shared arena per application accessible in both kernel mode and user mode of execution. The shared arena will be discussed below.

Figure 2C:
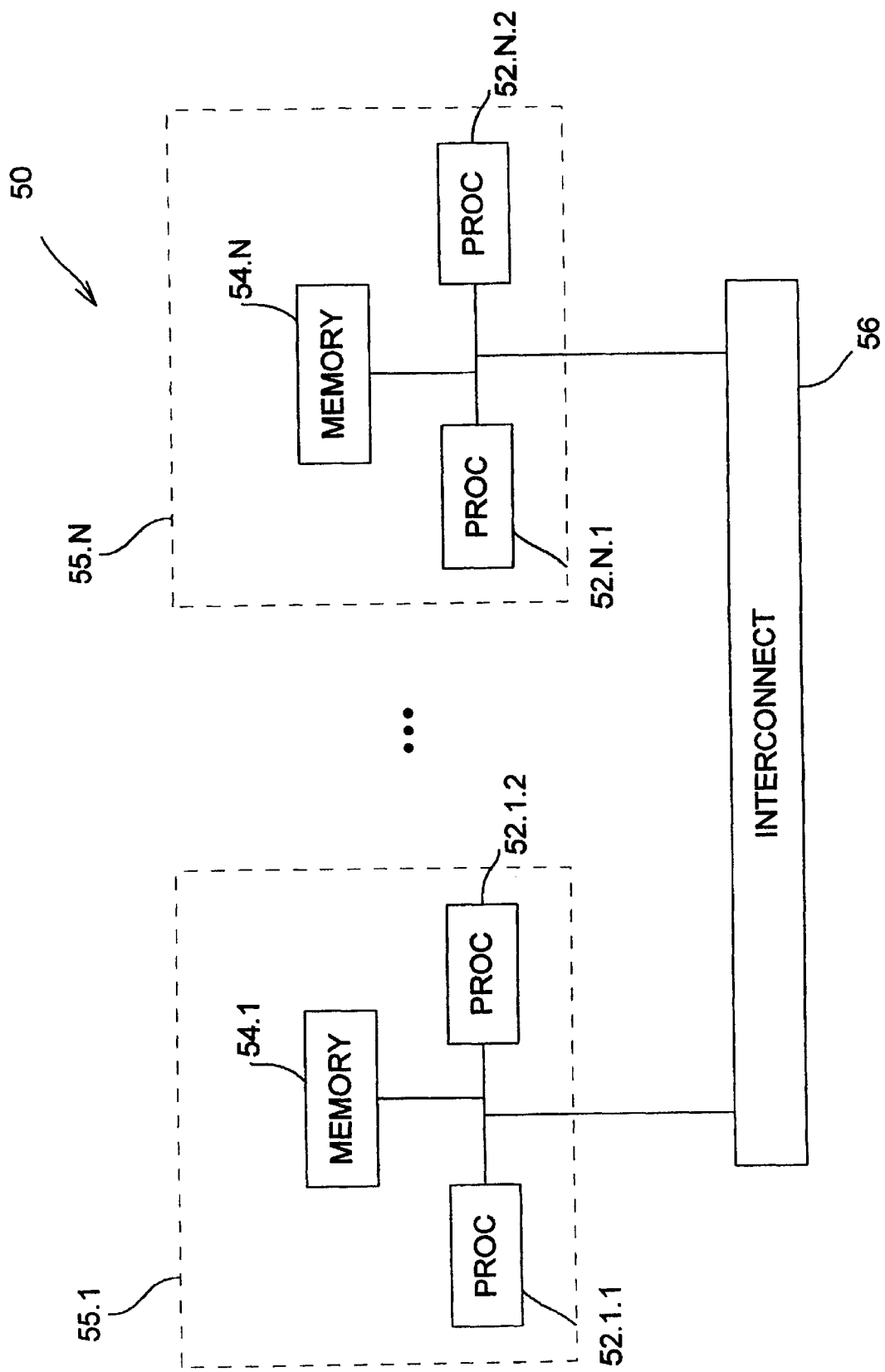

In FIG. 2c, computer system 50 includes memories 54.1 through 54.N distributed across N nodes 55, with two processors 52 assigned to each node and with an interconnect network 56 connecting the nodes 55. In one such embodiment, computer system 50 is a CC-NUMA system and memories 54.1–54.N are implemented under a shared memory model. In one such embodiment, the shared memories 54.1–54.N include a logical kernel space and a logical user space distributed across the physical shared memories 54.1–54.N. The logical user space includes a shared arena per application as will be discussed below.

Figure 2D:
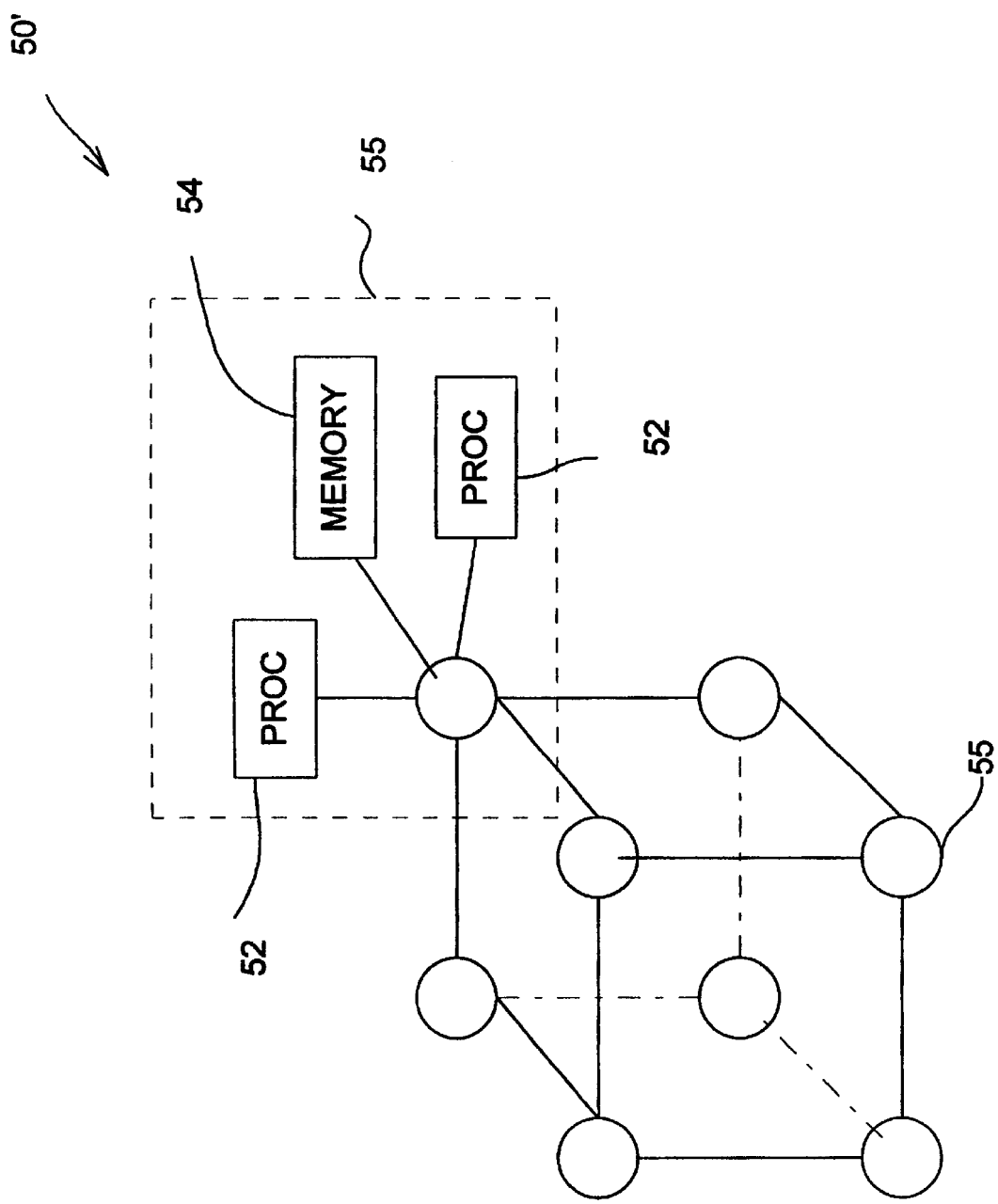

FIG. 2d shows a hypercube embodiment 50' of the computing system 50 of FIG. 2c in which each node 55 includes two processors 52 and a memory 54.

A nanothreads model is implemented in each of computer systems 10, 30 and 50. With nanothreads the basic idea is that each nanothreaded application has its own machine; that machine's configuration is dynamically controlled by the kernel. The application requests some number of processors from the kernel; based on the application's priority, the kernel allocates an appropriate number of processors to the application. The application then schedules its threads onto the resulting virtual multiprocessor machine. Since the physical computer system may be shared among multiple programs, the configuration of the virtual multiprocessor machine of a particular application may change dynamically over time. For example, a particular application's virtual multiprocessor machine may change from two processors to sixteen and back to four depending on the system activity. The application can determine the number of processors assigned to it at any instance of time. In one embodiment, the kernel-level scheduler tells the user-level scheduler how many processors are allocated. In such an embodiment, therefore, dynamic adjustments can be made to the parallelism (i.e., to the thread execution order and the number of threads executed) based on the configuration of the machine available to the application at any point in time. For example, a loop may have P iterations. Those P iterations could be executed in a four-way parallel configuration, a two-way parallel configuration or some other reasonable configurations. Depending on how many processors are allocated to the application, the user-level scheduler may dynamically adjust the degree of parallelism.

In effect, each nanothreaded application is a user process with some number of user-level threads and some number of kernel assigned processors represented by independently schedulable execution entities. The execution entities could be kernel threads, variable-weight processes, traditional UNIX processes or whatever abstraction the host system provides.

Figure 3:
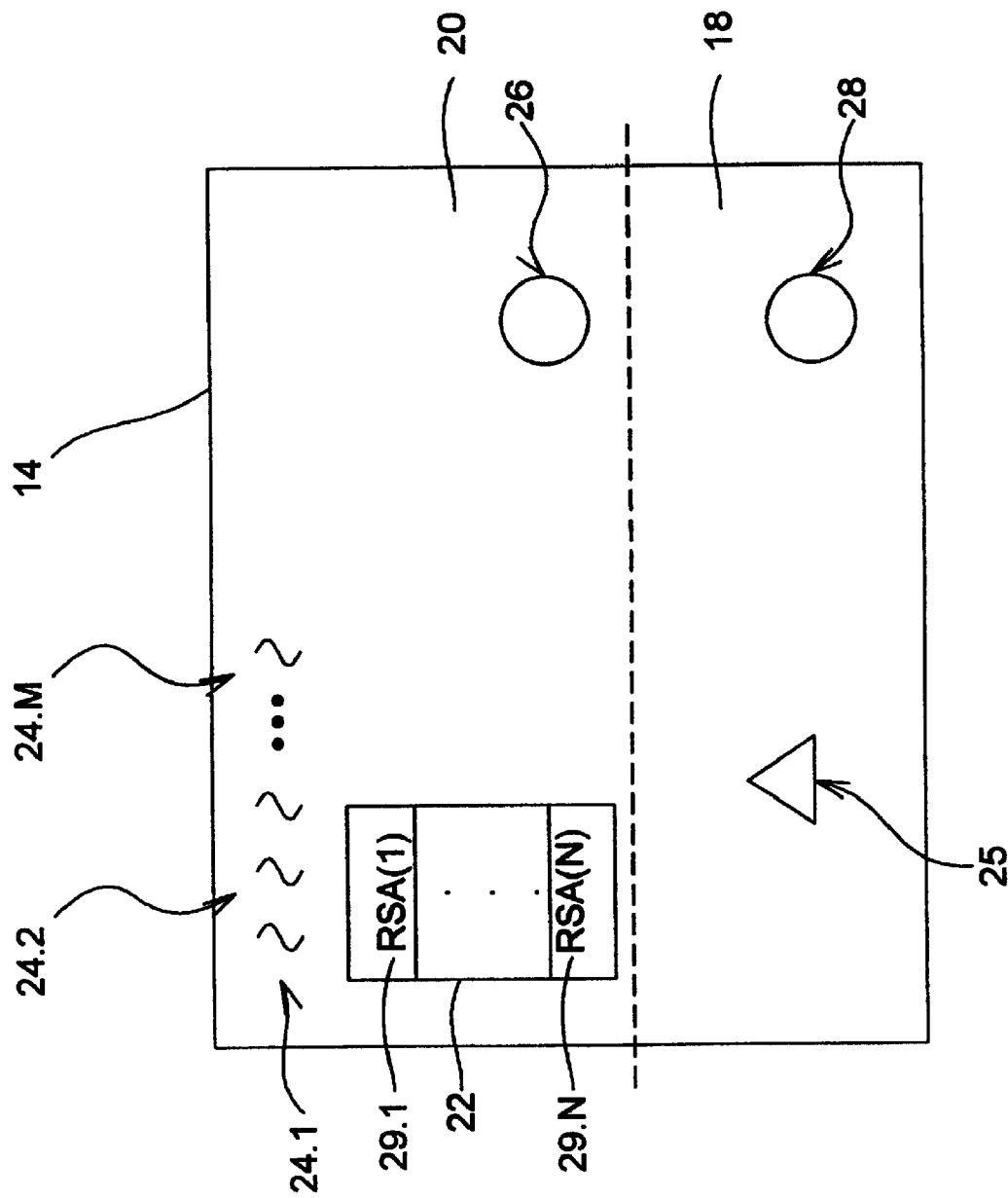

FIG. 3 illustrates a nanothreaded application's address space running on a single processor system. It should be obvious that this embodiment could be mapped on any computer system, including computer system 10 shown in FIG. 2a. In FIG. 3, threads 24.1 through 24.M are threads of a single multi-threaded application. FIG. 3 also depicts a user-level scheduler 26 running within user space 20, a kernel-level scheduler 28 in kernel space 18, an independently kernel schedulable execution entity 25 and a shared arena 22 having a plurality of register save areas 29, where each register save area 29 contains sufficient memory locations to store the context of one user-level thread 24.

In one embodiment, user-level scheduler 26 maintains a user-level run queue which tracks ready-to-run threads (e.g. threads 24). The application requests from the kernel some number of processors and kernel-level scheduler 28 assigns the processor represented in the application by execution entity 25 as appropriate. User-level scheduler 26 then selects a thread from the user-level run queue to map onto kernel thread 25 and identifies a register save area 29 associated with that thread. The selected thread then executes until the thread finishes, or the thread blocks, or the thread gets preempted by kernel-level scheduler 28. If a thread finishes, it is removed from the queue maintained by user level scheduler 26. User-level scheduler 26 can then choose either a ready-to-run thread from the threads remaining in the queue, or a preempted thread from those threads stored in register save areas 29, and start executing the selected thread. If a thread blocks, kernel-level scheduler 28 creates a new kernel thread to represent the processor and executes user level scheduler 26, which then selects a user-level thread to execute. The context of the blocked thread is saved in the kernel. Lastly, if a thread gets preempted by kernel scheduler 28 (e.g., by a higher priority task), the kernel saves the context of the thread in the designated register save area (rsa) 29 of shared arena 22. User-level scheduler 26 can then choose either a ready-to-run thread from the threads remaining in the queue, or a preempted thread from those threads stored in register save areas 29, and start executing the selected thread. (It should be noted that in a single processor system such as that shown in FIG. 2a, only a single thread can be executing at a time.

Figure 4:
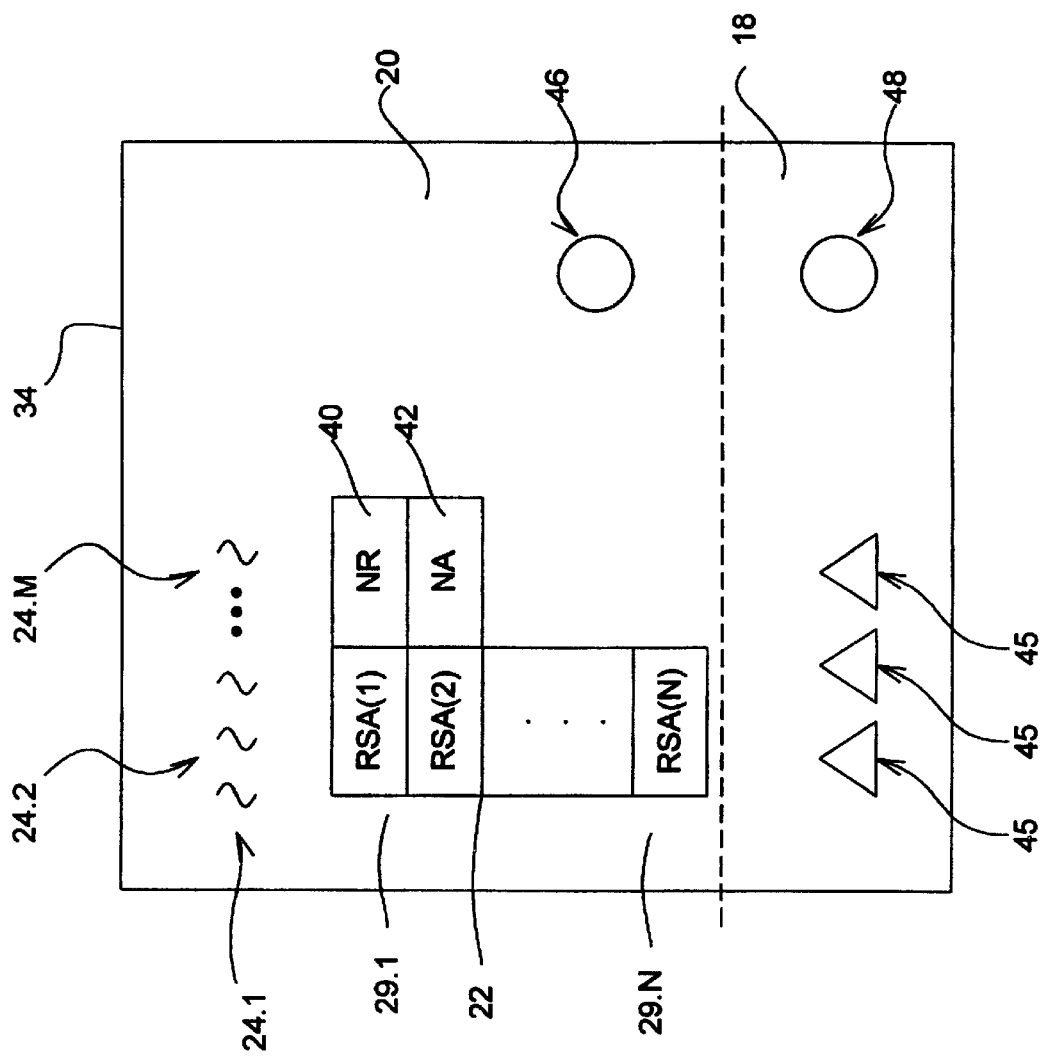
FIG. 4 illustrates a nanothreaded application's address space running on computing systems such as those shown in FIGS. 2b–2d.

FIG. 4 illustrates a nanothreaded application's address space running on a multiprocessor system. It should be obvious that this embodiment could be mapped on any of the computer systems 30 or 50 shown in FIGS. 2b through 2d. In FIG. 4, threads 24.1 through 24.M are threads of a single multi-threaded application. FIG. 4 also depicts a user level scheduler 46 running within user space 20, a kernel level scheduler 48 in kernel space 18, and independently kernel schedulable execution entities 45.

In one embodiment, user-level scheduler 46 maintains a user-level run queue which tracks ready-to-run threads. The queue is in shared memory space and is therefore accessible by any of the processors. The application requests from the kernel scheduler 48 some number of processors by writing into the number requested variable 40 (nr). The kernel-level scheduler 48 assigns some number of processors represented in the application by execution entities 45 as appropriate and indicates this assignment to the application by writing into the number allocated variable 42 (na). The number allocated to a process is less than or equal to the number requested. In a system in which only the one application is executing, user-level scheduler 46 will get the number of processors requested as long as that number does not exceed the number of physical processors. The user-level scheduler 46 then selects a thread from one of the threads 24.1–24.M to map onto each of the allocated kernel threads 45. Each selected thread then executes until the thread finishes, or the thread blocks, or the thread is preempted by kernel-level scheduler 48. If a thread finishes, it is removed from the queue maintained by user-level scheduler 46. User-level scheduler 46 can then choose either a ready-to-run thread from the threads remaining in the queue, or a preempted thread from those threads stored in register save areas 29, and start executing the selected thread. If a thread blocks, kernel-level scheduler 48 creates a new kernel thread and executes user level scheduler 46, which then selects a user-level thread to execute. Lastly, if a thread is preempted by kernel scheduler 48 (e.g., by a higher priority task), the kernel saves the context of the thread in a register save area (rsa) 29 of shared arena 22. User-level scheduler 46 can then choose either a ready-to-run thread from the threads remaining in the queue, or a preempted thread from those threads stored in register save areas 29, and start executing the selected thread.

In one embodiment, the variables nr and na are in both single and multiple processor systems in order to ensure compatibility across different systems.

In one embodiment, each process address space which uses the nanothread library is allocated some particular pages of memory that are always accessible. These pages become the shared arena 22 for that application. In such an embodiment, shared arena 22 therefore is treated like a special area of memory that is allocated when the nanothread library is initialized.

Synchronization is used to prevent one processor from incorrectly overwriting a variable written by another. Since, however, most of the communication actually happens only one way, this is not as much of a problem as it might seem. For example, in one embodiment the number of processors requested by an application (nr) is set only by the application; the kernel never writes into that memory location. Similarly, the number of processors allocated to an application by the kernel (na) is modified only by the kernel; the application never writes into that memory location. So, in such an embodiment, the synchronization problem is limited to controlling the number of entities that can write into a given location. in the shared arena. The exceptions are register save areas 29 and, in multikernel applications, the number allocated variable na. Register save areas 29 are written to by both the kernel and the application and, therefore, require synchronization. Likewise, in multikernel applications, na may be written to by each of the kernels and, therefore, requires synchronization.

Figure 5:
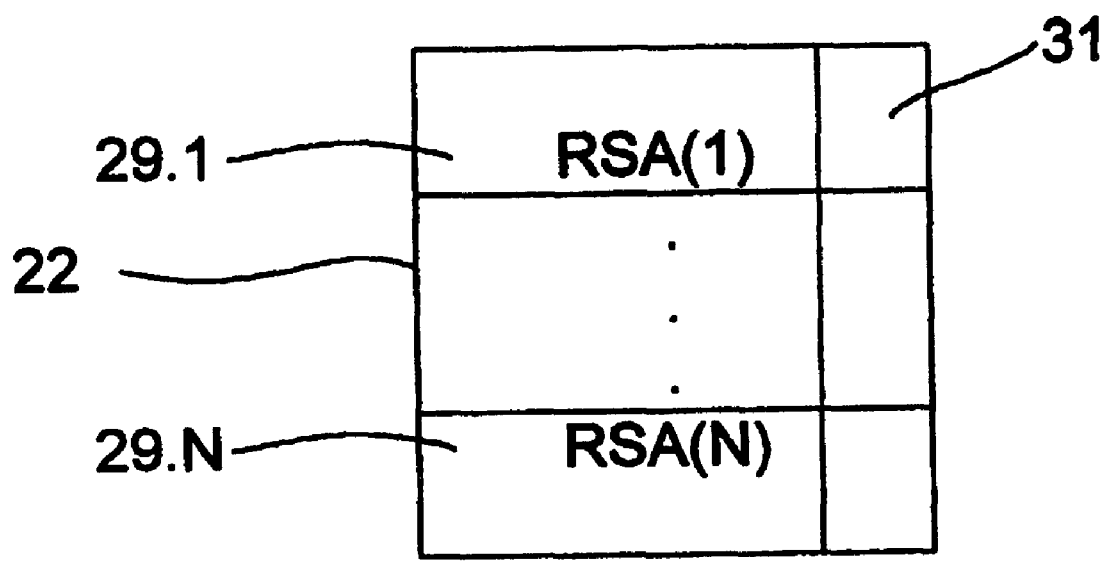
FIG. 5 illustrates one embodiment of a register save area with state field.

In one embodiment, systems 10 and 30 are limited to a fixed pool of register save areas 29 for each application even though each application's address space may be unbounded and, further, the number of threads that can be created for that application may be unbounded. This might be done, for instance, if system 10 or 30 does not want to keep on using additional memory to keep track of thread context; an increase in memory usage to track context results in a corresponding decrease in memory available for applications. In such an embodiment, a fixed number of rsa's 29 are provided and systems 10 and 30 recycle their rsa's 29 as they are used. In one such embodiment, a state field is included in each rsa 29 to indicate if the area 29 is active. In addition, the state field may be used to indicate whether the thread 24 assigned to that rsa 29 is running, blocked or preempted. A representative rsa 29 with state field 31 is shown in FIG. 5.

In one such embodiment, state field 31 of each rsa 29 can be retrieved by user-level scheduler 46 and kernel-level scheduler 48. State field 31 can be used as a mechanism by which user-level scheduler 46 lets kernel-level scheduler 48 know when a particular rsa 29 can be used for saving context of a thread 24. Synchronization on reads and writes to rsa 29 is needed, therefore, in such an embodiment, because rsa 29 is being allocated and freed by different entities.

In one embodiment, a thread is allocated an rsa on demand or when that thread needs to switch and save its state. In another embodiment, rsas are preallocated or are allocated across groups of threads.

Preempt Bit Vector

Figure 6:
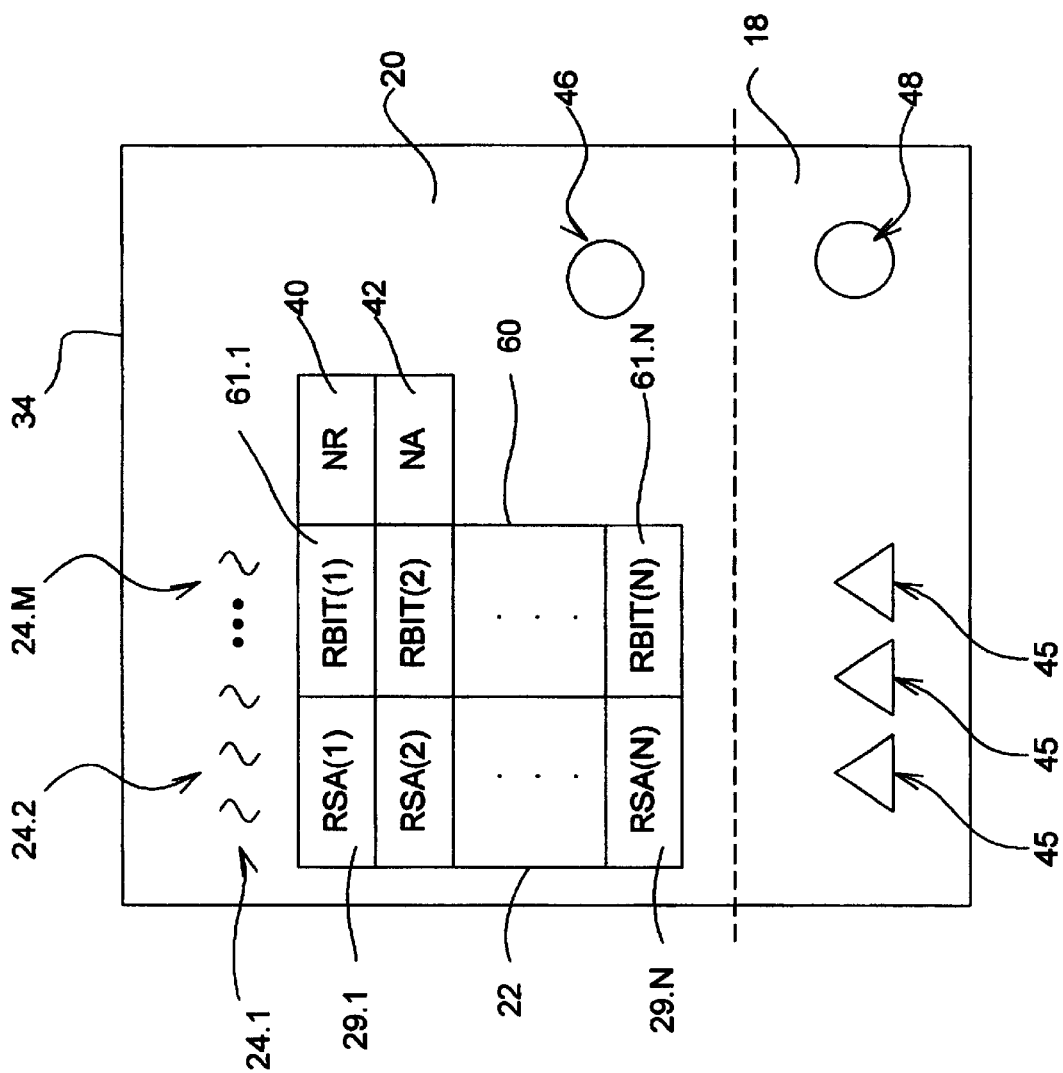
FIG. 6 illustrates another embodiment of a nanothreaded application's address space running on computing systems such as those shown in FIGS. 2b–2d.

FIG. 6 illustrates another embodiment of a nanothreaded application's address space running on a multiprocessing system. It should be obvious that this embodiment could also be mapped on any of the computer systems 30 or 50 shown in FIGS. 2b through 2d. In FIG. 6, threads 24.1 through 24.M are threads of a single multi-threaded application. As in FIG. 4, FIG. 6 also depicts a user-level scheduler 46 running within user space 20, a kernel-level scheduler 48 in kernel space 18, and independently kernel schedulable execution entities 45. The user-level scheduler 46 maintains a queue containing each of the runnable threads 24 to be executed. The queue is in shared memory space and is therefore accessible by any of the processors. The application requests from the kernel scheduler 48 some number of processors by writing into the number requested variable 40 (nr). The kernel-level scheduler 48 assigns some number of processors represented in the application by execution entities 45 as appropriate and indicates this assignment to the application by writing into the number allocated variable 42 (na). The number allocated to a process is less than or equal to the number requested. In a system in which only the one application is executing, user-level scheduler 46 will get the number of processors requested as long as that number does not exceed the number of physical processors. The user-level scheduler 46 then selects a thread from one of the threads 24.1–24.M to map onto each of the allocated kernel threads 45. Each selected thread then executes until the thread finishes, or the thread blocks, or the thread gets preempted by kernel level scheduler 48.

Shared arena 22 in FIG. 6 also includes a preempt bit vector 60. Each preempt bit vector 60 includes one or more rbits 61, where rbits 61 are used to store an indication of the threads 24 that have been preempted. In one embodiment, each of the threads 24 is assigned one bit in preempt bit vector 60 associated with that application. In addition, a register save area 29 associated with the assigned rbit is reserved for saving context when the thread is preempted. For every thread that has been preempted while in user space there is a corresponding register set that describes where it was preempted.

When a thread 24 is preempted, kernel-level scheduler 48 marks the rbit in preempt bit vector 60 corresponding to that thread which indicates that the thread has been preempted. User-level scheduler 46 (or, for that matter, any other thread) can query preempt bit vector 60 at any point in time and it can transfer control over to any of the preempted threads. To do this user-level scheduler 46 (or any other thread) determines the register save area 29 associated with the targeted preempted thread. It can then load context from register save area 29 and effectively transfer control to the preempted thread. This transfer can be performed without kernel intervention in order to avoid the cost of switching between the user and the kernel modes of execution.

By providing a low cost method of determining which threads, if any, are preempted, the preempt bit vector approach makes it possible to allow each application to decide which threads 24 should be executing (and which should not). Typically, these threads are coordinating among themselves using shared memory in user space without interacting with the kernel. Therefore, the kernel does not know the state of any of the threads. For example, when the kernel preempts a thread, other threads in the application could be waiting for the preempted thread to change the contents of some memory location. Because the thread was preempted, the other threads can waste system resources by spin-waiting until the preempted thread is selected again for execution. It is therefore desirable to be able to locate the preempted thread with very low overhead.

This process can be better understood by reviewing a couple of examples. For example, typical compute applications consist of sequences of serial sections and parallel loops. Transitions from a parallel loop to a serial section may be synchronized by a barrier. At the beginning of each of the parallel loops, the user-level scheduler sets the number requested variable to indicate the desired degree of parallelism. It subsequently queries the number allocated variable to determine the actual degree of parallelism that can be achieved. Based on the number of allocated processors, a suitable number of threads 24 are used to execute the loop in parallel. After the allocated loop work is computed, each thread synchronizes at the barrier; after all the threads have arrived and synchronized at the barrier, the next serial or parallel section is started. It is possible that while the threads execute the parallel section, one or more of them may be preempted. In current systems, the remaining executing threads will complete their work and spin at the barrier, waiting for the other preempted threads to be allocated processors, and complete their work; this wait can be substantial. In a nanothreaded model formed according to the present invention, instead of spinning, the threads that have completed their work can query the preempted bit vector to determine that the other threads working on the loop have been preempted; if so, the threads which have finished work can transfer control of their respective processors to the preempted threads, thus resuming them. In one embodiment, the transfer of processor is accomplished in the nanothreads model by a resume interface and requires no kernel intervention.

Preempt bit vector 60 is therefore just a centralized, easily accessible, summary of information that is available elsewhere. Such information is available in current systems, but the information is stored in kernel data structures. Thus, in current systems, it is expensive to collect and extract the information in user-level code such as at the end of a parallel loop as part of a barrier and this cost can be prohibitive. In contrast, the nanothreads architecture includes a preempt bit vector 60 in user space 20 such that the critical scheduling information can be accessed by user-level code in an inexpensive manner.

In another example, an application may include a synchronization package having a spin lock. Spin lock synchronization is a lightweight synchronization mechanism used to control access to shared variables. In the present example, a thread A currently executing on a processor 52 is the owner of a spin lock. When thread A on processor 52 owns the lock, any other thread B trying to acquire the lock will have to wait until thread A releases the lock; thread B spins while waiting for the lock. Thread A may now be preempted from processor 52. However, thread B has no knowledge of such an event, and it keeps spinning, wasting processor time.

In a system with an inexpensive preemption detection mechanism, the lock algorithm is changed such that when thread B enters the spin lock, it can spin for a while, check to see if the owner of the spin lock has been preempted; if the spin lock owner has been preempted, thread B can transfer its processor to thread A, thus resuming thread A. Thread A can then get through the critical-section, release the lock and allow another thread such as B to acquire the lock.

Preemption Detection Applications

The preempt bit vector can be used by itself as a preemption detection mechanism (i.e., without the use of register save areas or the variables nr or na). An example of such an embodiment for a single processor system (such as is shown in FIG. 2a) can be seen in FIG. 7.

Figure 7:
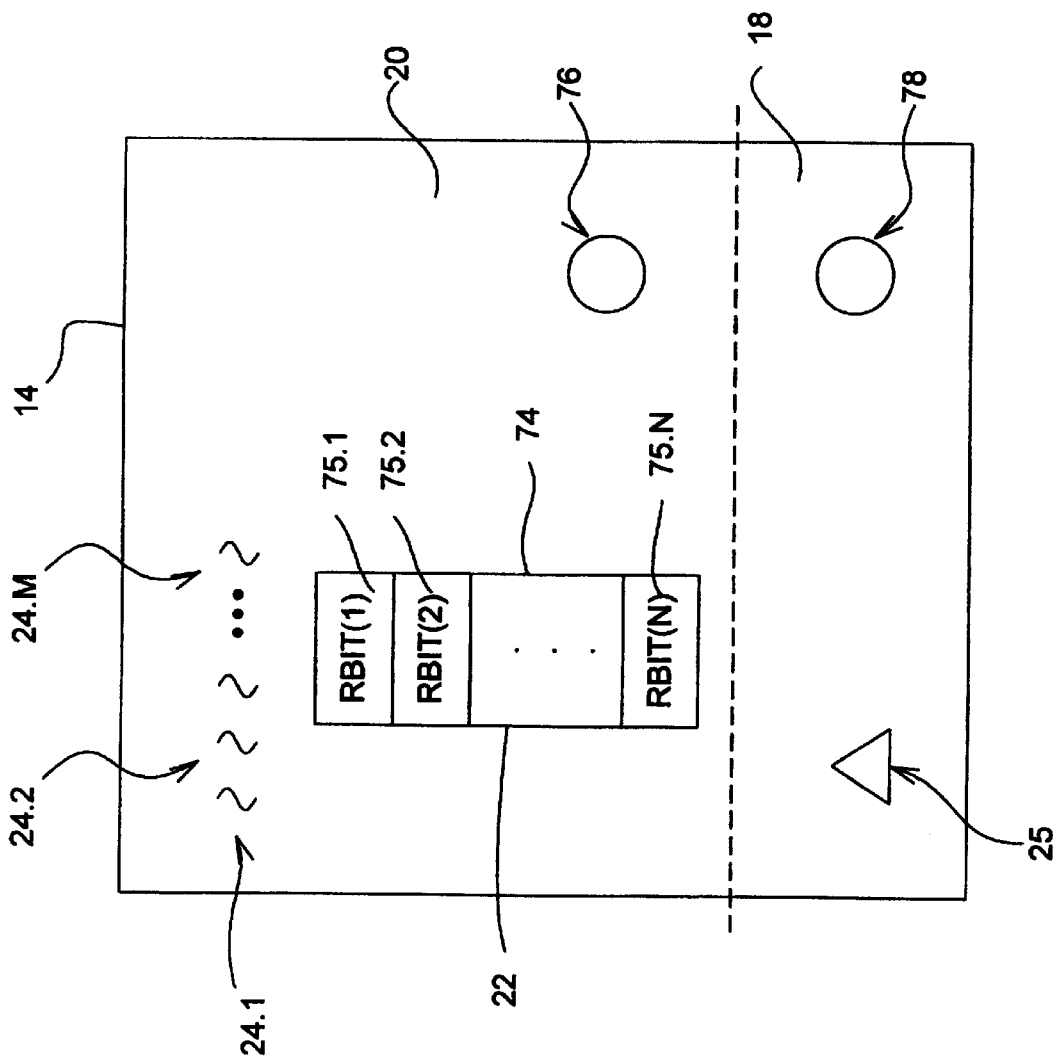
FIG. 7 illustrates a preemption detection mechanism.

In FIG. 7, a preempt bit vector 74 maintained in user space 20 is used to store an rbit 75 associated with each user level thread 24 in the queue of user level scheduler 76. Rbit 75 can be set, e.g., when a thread is preempted. User level scheduler 76 can then determine which thread 24 from the threads 24 marked in preempt bit vector 74 should be selected for execution. In one embodiment, an interface is provided which can be used by a programmer to force scheduler 76 to review preempt bit vector 74. Finally, in a time slice application, user-level scheduler 76 may review bit vector 74 at predetermined time slices in order to select the best thread to run in the next time slice.

Figure 8:
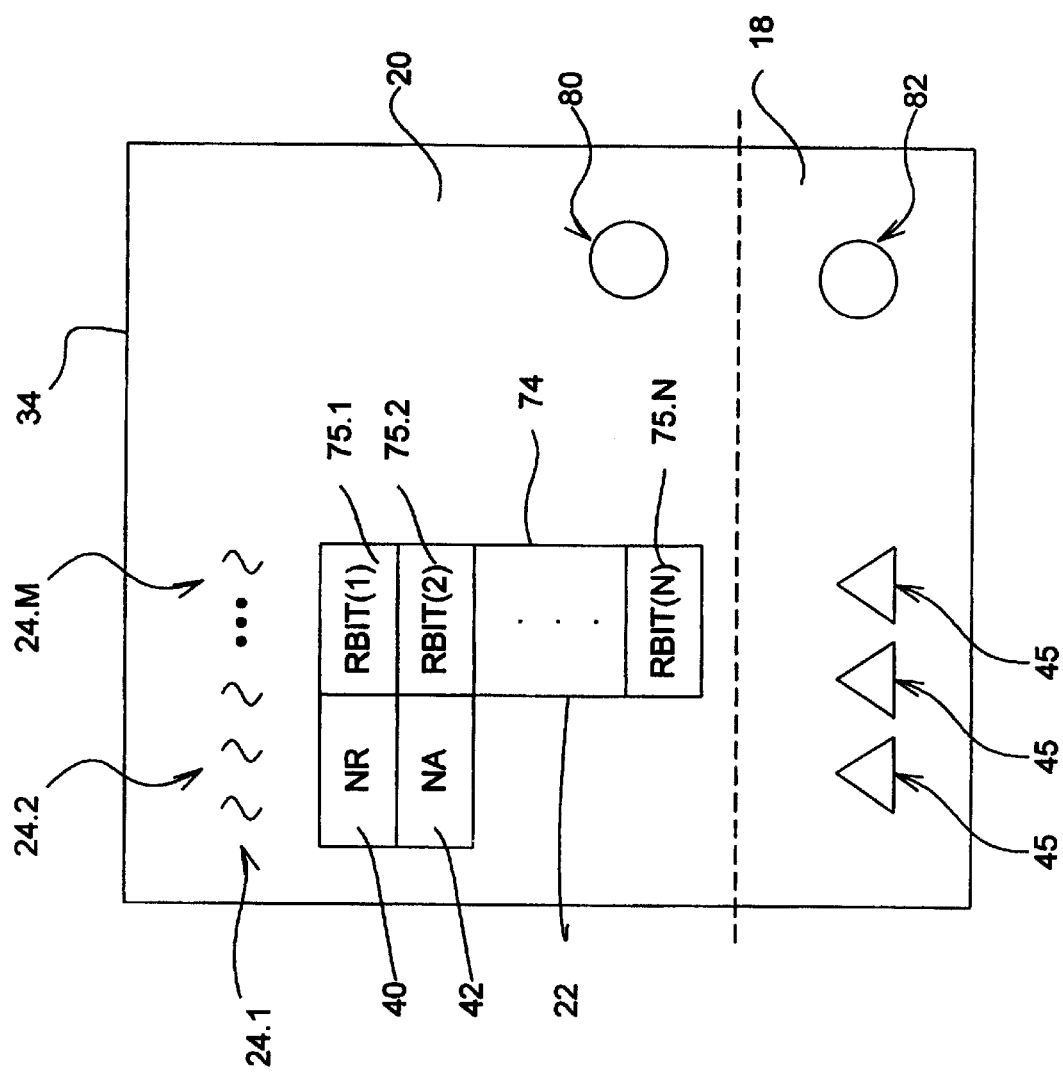
FIG. 8 illustrates another embodiment of the preemption detection mechanism of FIG. 7.

Likewise, the preempt bit vector can be used as a preemption detection mechanism for multiprocessor computing systems even without the use of register save areas. Such an embodiment is shown in FIG. 8, where a preempt bit vector 74 stored in user space 20 is used to store an rbit 75 associated with one or more of the threads 24 in the user-level run queue of user-level scheduler 80. Rbit 75 can be set, e.g., when a thread is preempted. User-level scheduler 80 can then determine which of the threads from the threads marked in preempt bit vector 74 should be selected for execution. In one embodiment, an interface is provided which can be used to force scheduler 80 to review preempt bit vector 74. Finally, in a time slice application, user level scheduler 80 may review bit vector 74 at predetermined time slices in order to select the best thread to run in the next time slice. Once again, as is noted above, the preempt bit vector provides an easily accessible, low cost and centralized source of information on preempted threads.

It should be noted that in the embodiment shown in FIG. 8 the variables nr and na have been provided as a mechanism by which a user-level scheduler 80 can request, and kernel-level scheduler 82 can allocate, an appropriate number of processors to execute the available, runnable, threads. Other mechanisms can, of course, be used to provide this functions. Therefore, it may be advantageous in some multiprocessor systems to simply use preempt bit vector 74 without the variables nr and na.

Context Switching

In a multithreaded environment, it is important to efficiently save the complete user state (user registers and the program counter) of a thread and restore the complete user state of another thread, thus effecting a context switch. Efficiency dictates that this operation not involve the kernel. The kernel can preempt a user thread at any point during execution and in one embodiment, if the thread is runnable, its user state is saved to a predefined location in the user's memory, the register save area. The address of the register save area is part of each thread's context as the kernel must be able to find the rsa at all times during the execution of the thread. Another running thread could then resume the preempted thread simply by loading the preempted thread's user state.

In one such embodiment, each thread's context is defined by a user state including a program counter value, a context-id value, which uniquely identifies a thread to the user-level scheduler, and N register values, where N is the number of registers in processor 32. The context-id of the currently executing thread is stored to a fixed memory location known to, and readily accessible by, the kernel or kernels.

There are some problems associated with a thread A attempting to resume the user state of another thread B.

The first problem is how to set all of the registers to thread B's context, yet retain a register in order to point to thread B's register save area or context-id.

A second problem is how to set the program counter of thread B. In most embodiments, the program counter must be the last piece of user state to be restored; the processor begins executing thread B's instructions immediately after the program counter is loaded. In load-store architectures, the program counter can be loaded only from another register; in other architectures the program counter can be loaded from a memory location—however, the memory location needs to be identified by a register. In either architecture, it then follows, that a register R is needed to store information about the program counter of thread B. However, after the program counter is loaded, thread B's register R is not fully restored, since register R is being used by the mechanisms to load the program counter.

Finally, the programming environment must not be compromised by restricting the use of special operations such as atomic operations, and operating system mechanisms such as signal delivery. Any processor state associated with atomic operations, and any state associated with the operating system, such as state associated with signal delivery mechanisms, should be restored properly when a context switch from thread A to thread B occurs.

A simple solution to the problem of setting all the registers to the new thread's context is to overwrite the register pointing to the new context as the last operation in the context switch. This must be done, however, in a way which allows the program counter value of the new context to be read and stored.

Note that in existing systems, context switch of preempted threads is accomplished by executing program code in protected kernel mode. Special instructions, such as return-from-exception, allow the loading of the program counter value of the preempted thread; such an instruction can be executed only in kernel mode.

In view of this, the user-level context switch described below is unique in that it restores all necessary user state on a load-store architecture without kernel intervention. Further, this ability to restore user state does not require dedicating a user register to store the address of the register save area. This approach does require that a user context not use memory ahead of the stack pointer. This limitation, however, already is a requirement for normal UNIX signal handling. The approach also requires that user context not depend upon a particular thread's system state. A few pertinent examples of system thread state are virtual to physical mapping tables and file descriptors, however, in a multithreaded program most system state is shared.

In one embodiment of the systems of FIGS. 2a–2d, processors 12, 32 and 52 have an instruction set capable of executing a register load instruction during execution of a jump instruction. This may take the form of an instruction set having a jump instruction with a delay slot (as is available in the MIPS architecture) or the instruction set may be a very long instruction word (VLIW) architecture such that a load register instruction can be placed within the same VLIW instruction as the jump instruction.

Figure 9:
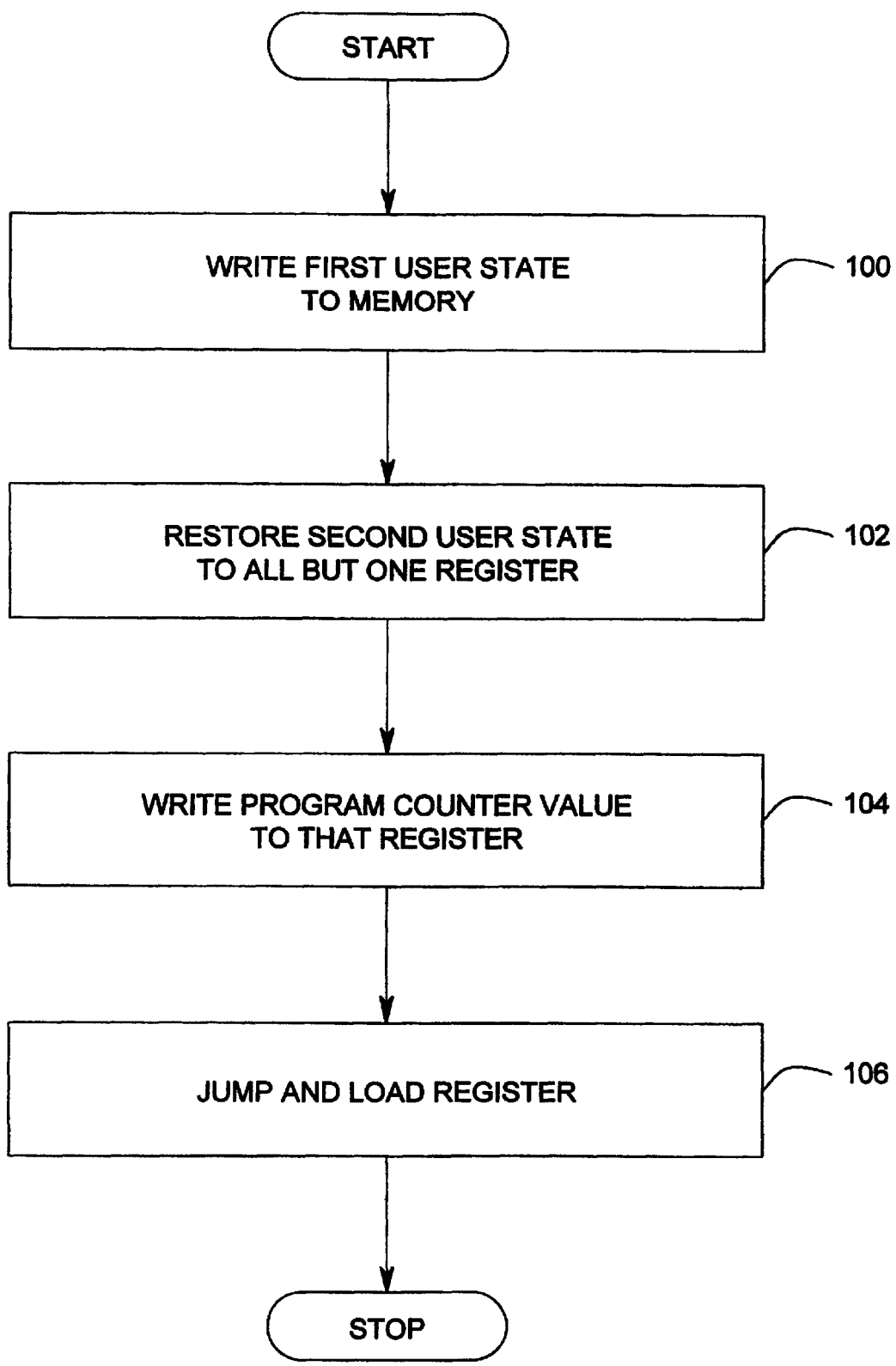
FIG. 9 illustrates a sequence of steps taken to change context while remaining in user space.

One embodiment of a method of switching between a first user thread 24 and a second user thread 24 while remaining within user space is shown in FIG. 9. In FIG. 9, a processor 32 first writes, at 100, a first user state, as previously defined, describing the context of the first user thread.

At 102, processor 32 restores a second user state describing the context of the second user thread. The step of restoring includes the steps of writing register values associated with the second thread to all but a first register and writing the context-id value. Processor 32 then moves to 104, where the second thread's program counter value is written to the first register. At 106 processor 32 jumps to the program counter value stored in the first register while loading the last remaining register value to the first register.

It should be noted that although the embodiment above is described in terms of switching between user threads, it should be apparent that the same method can be used to switch between other types of execution entities.

In one embodiment of the method shown in FIG. 9, a processor 12, 32 or 52 executes the following steps in performing a context switch from thread A to thread B where thread A is currently executing:

1. Mark thread A so that it cannot be resumed by another thread for the duration of the context switch.
2. Determine thread A's register save area (rsa).
3. Save thread A's user state in the rsa.
4. Atomically unset the bit in the preempt bit vector to indicate that thread B is no longer runnable. If the bit was successfully cleared, the processor is committed to running thread B. If the bit was already clear, then restore the context of thread A.
5. Determine the address of thread B's register save area. Store that location in the last register to be overwritten. The context-id of thread B is stored in the second to last register to be overwritten. Restore the stack-pointer from the user state of thread B.
6. Set the bit in the preempt bit vector indicating that thread A is runnable.
7. Restore onto processor 32 all the user state of thread B, except the two registers in step 5 and thread B's program counter.
8. To avoid a nested resume, check the program counter of thread B to ensure thread B was not already executing a resume. If thread B was already executing a resume, skip step 9. (A nested resume is a resume where the target thread is between steps 10 and 14.)
9. Copy the two registers and program counter that have yet to be loaded below thread B's stack. There is no longer a dependency on needing a pointer to the address of thread B's rsa.
10. Set the current context-id to thread B's context-id.
11. Load the second to last register from thread B's stack.
12. Load the program counter into the last register.
13. Jump to the value contained within the last register. This sets the program counter.
14. In the delay slot of the jump, load the last register from thread B's stack.

In the above description, saving of thread A's user state is not difficult since the context switch is executed in thread A's context—thread A can save as much state as necessary to give the context switch code temporary registers to save all remaining user state. Restoring thread B's context poses the problems discussed above.

It is the combination of steps 8 through 14 that solve the problems mentioned earlier. It is also necessary to increment the stack pointer used by UNIX signal handling routines to avoid overwriting the values set in step 9. The essence of the user-level context switch is summarized in the MIPS assembly code fragment below.

ld $30, offset_31($31)
sd $30, -8($29)
ld $30, offset_30($31)
ld $31, offset_PC($31)
jr $31
ld $31, -8($29)

It is important to note that there is no other means to perform a user-level context switch other than the technique of using both the user's stack and the equivalent of a branch delay slot in most processors to date. If a processor must load the program counter into a register before setting the program counter, then there is one register that has yet to be loaded when the program counter is set. The additional instruction provided by the branch delay slot, or an additional instruction in a VLIW architecture, are the only means for setting this last register.

In another embodiment, a processor 12, 32 or 52 goes into the kernel for a brief instance to switch context. This may be done, for example, in applications requiring a register overlay of, for instance, N registers, where the processor only has N registers and one or more additional registers are needed to perform the jump to the next user thread. Such an application may require a switch into kernel space 18. In such embodiments, the time to perform the switch into and out of kernel space 18 can be minimized by creating a dedicated path into and out of kernel space which just switches context and immediately returns. This avoids the argument checking of a regular kernel call.

Multikernel Systems

As the number of processors in multiprocessor systems increase, it has become increasingly important to provide mechanisms for graceful degradation of the system in the presence of software or hardware faults. For instance, in one embodiment of computer system 50 of FIG. 2c, there are sixty-four nodes 55 and each node 55 includes two processors 52 and a memory 54. Each node 55 is connected through an interconnect 56 to another set of two processors 52 and one memory 54. Each memory 54 serves as a local memory for its processors 52. In addition, each memory 54 is also accessible by other processors 52. That is, each memory 54 is part of a large logically global memory bank although the memory model is based on a NUMA model. For instance, in one embodiment, the interconnect 56 forms a hypercube such as is shown in FIG. 2d. In one such embodiment, a processor 52 can access its local memory 54 in approximately 300 nanoseconds. In order to access memory in the nearest neighboring node, one hop away, the access time doubles to approximately 600 nanoseconds. And then for each additional hop traveled, 100 nanoseconds is added to the total access time. In this embodiment, the first hop is the most expensive and subsequent ones are incremental. Such an embodiment encourages NUMA affinity scheduling. That is, it is advantageous to try and schedule processes near their memory in order to avoid this initial penalty.

Figure 10:
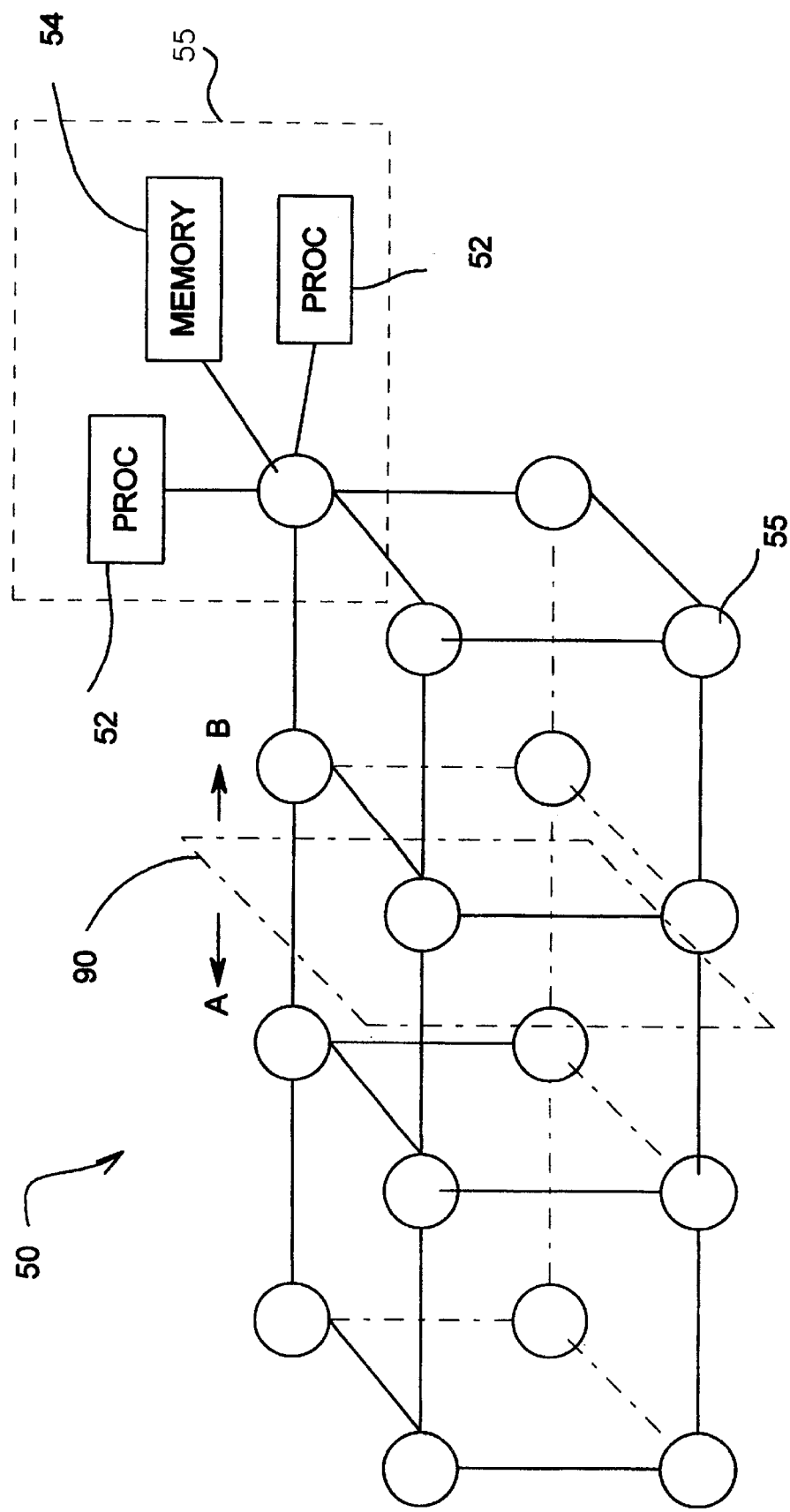
FIG. 10 illustrates a computer system partitioned into two sections, where each section operates under a separate kernel.

In existing systems, if one of the processors 52 takes a fault in either software or hardware, the entire machine may become unavailable. So in order to have higher availability, in one embodiment of this invention, system 50 includes an operating system which provides multiple kernels; faults that occur in a kernel may therefore be contained within the scope of that kernel in such a way that other kernels are not affected by the fault. The number of processors 52 assigned to each kernel is configurable. Such a system 50 is shown in FIG. 10. As shown in FIG. 10, in one embodiment, system 50 includes sixteen nodes 55 connected in a hypercube topology. Each node 55 includes two processors 52 and a memory 54. In the system 50 shown in FIG. 10, an imaginary plane 90 bisects system 50 into two groups (A and B) of eight nodes 55. Group A is assigned to a first kernel while group B is assigned to a second kernel. Other combinations of processors can be assigned to each kernel. In another embodiment, for example, eight processors 52 are assigned to a first kernel while twenty-four processors 52 are assigned to a second kernel. In another, larger, embodiment, thirty-two processors 52 are assigned to each kernel.

In order to effectively contain faults due to random writes to memory locations, the kernel memory directly managed by one kernel must be protected from accesses by another kernel. Any communication between these kernels has to be performed through messages. Although messages provide controlled access to the state of another kernel, they are expensive relative to regular memory references. This additional cost in using messages is acceptable for the use of kernels to access the state of each other; but, messages add unacceptable communication overheads to transfers of user data. Thus, in one embodiment, user data is directly accessible across the entire system, even if the application spans multiple kernels. Under this approach, therefore, any kernel can access all of the memory that is being used for user data.

In the multi-kernel example shown in FIG. 10, eight nodes 55 (or sixteen processors 52) are assigned to each kernel. To schedule an application which requires more than thirty-two processors, the application needs to span two or more kernels. In existing systems, such scheduling across kernels needs communication between the kernels to coordinate the scheduling; however, such communication is expensive and tends to diminish any benefits that might be received from executing the threads in parallel. Partly because of this reason, existing systems do not support scheduling of multithreaded processes across multiple kernels. In a nanothreaded system, however, the use of register save areas in shared arena 22 to save context of a preempted thread and of the user-level run queues to hold ready-to-run threads allows these threads to be scheduled in parallel if the application spans multiple kernels, and without kernel-to-kernel communication. This is because each kernel has access to the register sets and run queues of user-level threads and can load them onto the processors it controls.

Figure 11:
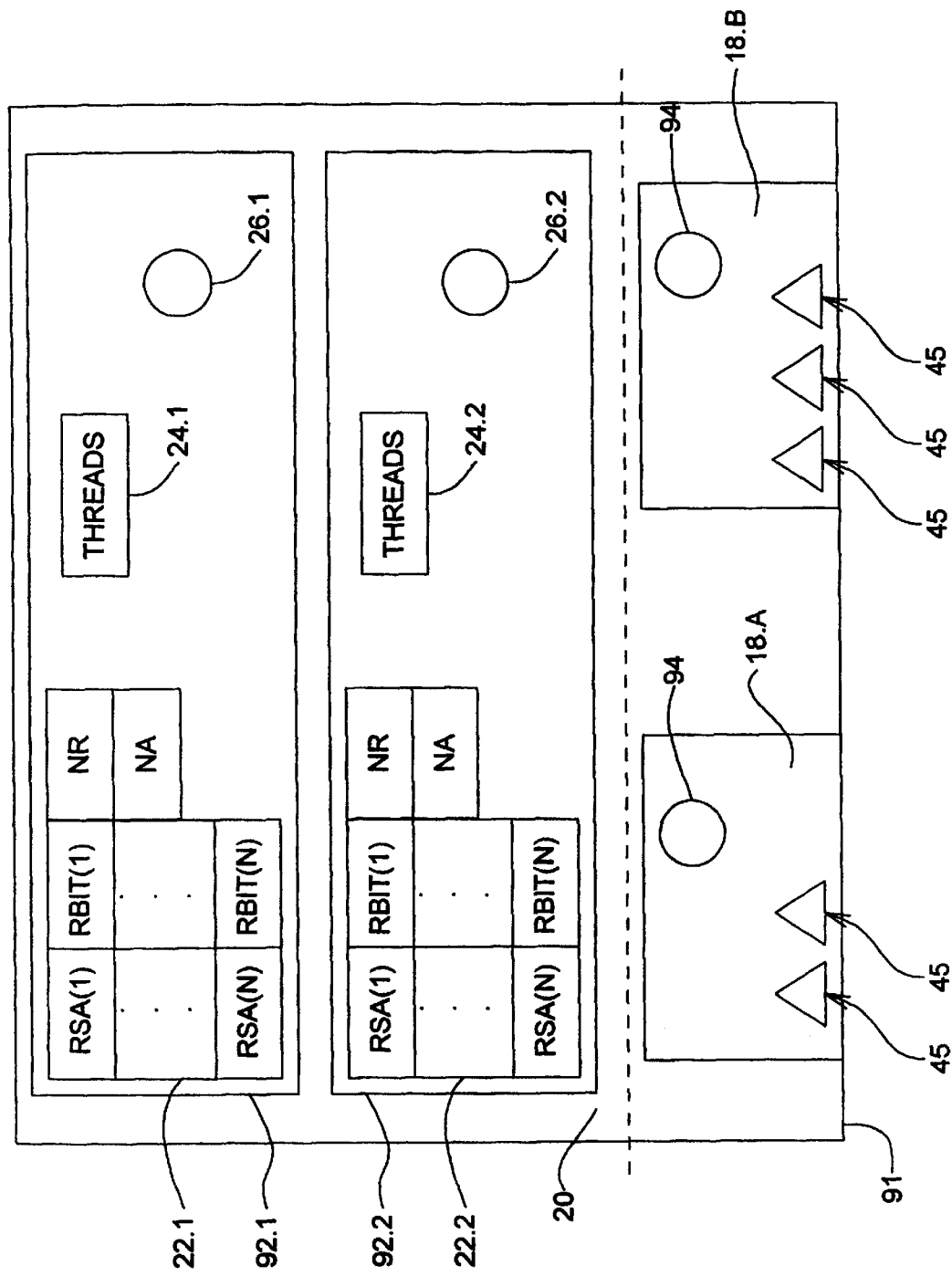
FIG. 11 illustrates the address spaces of two nanothreaded applications running on a computing system such as that shown in FIG. 10.

One embodiment of such a system 50 is shown in FIG. 11. FIG. 11 illustrates the address space of two nanothreaded applications running on a multiprocessor system such as system 50. In FIG. 11, a user shared memory 91 includes a shared arena 22 per application and a user level scheduler 26 per application. A kernel level scheduler 94 exists in each of the kernels A and B. Each kernel level scheduler can create and assign kernel threads 45 to work on a particular application. The shared arena 22 is accessible by both the kernels.

In one such embodiment, such as is shown in FIG. 11, each application has its own shared arena 22 with a nr 40, na 42, preempt bit vector 60 and array of rsas 29. (In the example shown in FIG. 11, two applications exist in shared memory 91, each with a shared arena 22 (i.e., 22.1 and 22.2) and user level scheduler 26 (i.e., 26.1 and 26.2) operating in its own application memory space 92.) But since each arena 22 is in user space 20, they are visible by the entire set of kernels in the system. When a processor becomes idle, the kernel scheduler allocates the processor to a particular process; the processor then looks in the corresponding shared arena 22 and determines if another processor is required by this process—this is the case when nr is greater than na. If a processor is not needed, it returns to the kernel and is allocated to another process. If the processor is needed, however, na is incremented and a thread is selected for execution by the processor. So if one application has requested sixty-four processors and it is entitled to sixty-four, sixteen may be allocated by one kernel, sixteen by a second kernel, sixteen by a third kernel, etc., until the full complement of processors 52 is allocated. If more than the necessary number of processors are allocated to an application, the excess processors are returned to the kernel and are allocated to another application.

As noted above, in traditional systems, the context is usually stored in the kernel; in order to schedule a thread from another kernel, a processor must communicate with the other kernel to load the context. In the nanothreaded system described above, however, no such kernel to kernel communication via messages is required in order to schedule threads of an application spanning multiple kernels. Instead, register save areas 29 hold the context of any preempted thread 24 that requires service—no kernel to kernel communication is required to access any rsa 29. Likewise, user-level run queues accessible by any kernel contain the ready-to-run threads—no kernel to kernel communication is required to access any user-level run queue. That is, the necessary context information is accessible to all kernels either through the application's run queue or through its rsa(s). Therefore, a processor can access the appropriate run queue or rsa, load the thread selected and execute it. A single application can thus span the entire width of the machine with no kernel-to-kernel communication. This approach therefore makes thread scheduling more efficient and does not affect the reliability of the system.

As noted above, the size of each register save area depends on the processor hardware. This is because the rsa is just a snapshot of the contents of the underlying machine. In current MIPS-based systems, there are approximately thirty-two registers per thread. (In addition, there may be up to an additional thirty-two floating point registers which must be saved in order to fully save context.) Likewise, the number of register save areas required depends on the number of threads. In one embodiment, sixty four register save areas are provided. It should be realized, however, that the number of register save areas provided in any one application is limited only by the amount of memory to be dedicated to this function.

As noted above, by providing shared arenas per application that include register save areas, a preempt bit vector, nr and na state variables, threads can be scheduled across multiple kernels with no kernel-to-kernel communication. By providing both a preemption detection mechanism such as the preempt bit vectors and a register save area for storing thread context, critical information regarding a thread's state has been located in user space where it is readily accessible and the access is inexpensive.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof

What is claimed is:

1. In a computing system having a processor and a memory, wherein the processor operates within both a user mode and a protected kernel mode, a method of detecting preempted execution entities, the method comprising the steps of:
    providing a plurality of execution entities, wherein each execution entity runs in user mode;
    forming a preempt bit vector accessible to execution entities running in user mode, wherein the preempt bit vector includes a plurality of rbits, wherein each rbit is associated with one of the plurality of execution entities, wherein the step of forming a preempt bit vector includes the step of marking, via a program executing in protected kernel mode, bits in the preempt bit vector corresponding to preempted execution entities; and
    reading, via program code executing in user mode, bits in the preempt bit vector to determine runnable execution entities.

2. The method according to claim 1, wherein the execution entities are threads.

3. The method according to claim 1, wherein the step of marking includes the steps of:
    detecting a preempted execution entity; and
    setting a bit in the preempt bit vector corresponding to the preempted execution entity.

4. The method according to claim 3, wherein the method further comprises the step of executing an execution entity selected from the execution entities determined runnable during the reading step; and
    wherein the step of executing includes the steps of:
        loading state associated with the selected execution entity; and
        marking a bit in the preempt bit vector corresponding to the selected execution entity to indicate that the selected execution entity has been restored.

5. The method according to claim 1 wherein the step of reading includes the step of caching the preempt bit vector.

6. In a computing system having a plurality of processors and a memory, wherein each processor operates within both a user mode and a protected kernel mode, a method of detecting preempted execution entities, the method comprising the steps of:
    providing a plurality of execution entities, wherein each execution entity runs in user mode;
    forming a shared memory arena within the memory, wherein the shared memory arena is addressable by each of the plurality of processors;
    forming a preempt bit vector within the shared memory arena such that the preempt bit vector is accessible to the plurality of the execution entities running in user mode, wherein the preempt bit vector includes a plurality of rbits, wherein each rbit is associated with one of the plurality of execution entities, wherein the step of forming a preempt bit vector includes the step of marking, via a program executing in protected kernel mode on one of the plurality of processors, bits in the preempt bit vector corresponding to preempted execution entities;
    reading, via program code executing in user mode on one of the plurality of processors, bits in the stored preempt bit vector to determine runnable execution entities.

7. The method according to claim 5, wherein the execution entities are threads.

8. The method according to claim 5, wherein the step of marking includes the steps of:
    detecting a preempted execution entity; and
    setting a bit in the preempt bit vector corresponding to the preempted execution entity.

9. The method according to claim 8, wherein the method further comprises the step of executing an execution entity selected from the execution entities determined runnable during the reading step; and
    wherein the step of executing includes the steps of:
        loading state associated with the selected execution entity; and
        marking a bit in the preempt bit vector corresponding to the selected execution entity to indicate that the selected execution entity has been restored.

10. The method according to claim 6 wherein the step of reading includes the step of caching the preempt bit vector.

11. A computing system, comprising:
    a processor having a user mode and a protected kernel mode;
    a memory connected to the processor, wherein the memory includes a preempt bit vector accessible to program code modules executing in user mode, wherein the preempt bit vector includes a plurality of rbits, wherein each rbit is associated with one of a plurality of execution entities; and
    program code, executing in the processor, for marking each rbit when its associated execution entity is stalled or preempted.

12. A computing system, comprising:

a plurality of processors, wherein each processor has a user mode and a protected kernel mode;

a memory connected to the plurality of processors, wherein the memory includes a preempt bit vector accessible to program code modules executing in user mode in each of the plurality of processors, wherein the preempt bit vector includes a plurality of rbits, wherein each rbit is associated with one of a plurality of execution entities; and program code, executing in one of the plurality of processors, for marking each rbit when its associated execution entity is stalled or preempted.

13. In a computing system having a memory and a plurality of processors, including first and second processors, wherein each processor of the plurality of processors operates within both a user mode and a protected kernel mode, a method of detecting preempted execution entities, the method comprising the steps of:

providing a plurality of execution entities, wherein each execution entity of the plurality of execution entities runs in user mode;

forming a shared memory arena within the memory, wherein the shared memory arena is accessible to each processor when it operates in protected kernel mode;

forming a preempt bit vector within the shared memory arena, wherein the preempt bit vector includes a plurality of rbits, wherein each rbit is associated with one of the plurality of execution entities, wherein the step of forming a preempt bit vector includes the step of marking, via a program executing in protected kernel mode on one of the plurality of processors, bits in the preempt bit vector corresponding to preempted execution entities from the plurality of execution entities;

reading, via program code executing in user mode on one of the plurality of processors, bits in the preempt bit vector to determine runnable execution entities.

14. The method according to claim 13, wherein the method further comprises the steps of:

assigning the first processors to a first operating system kernel; and assigning the second processors to a second operating system kernel; and wherein the step of reading includes the step of granting read access to the shared arena to each of the first and second processors.

15. The method according to claim 14, wherein the execution entities are threads.

16. The method according to claim 14, wherein the step of marking includes the steps of:

detecting a preempted execution entity; and setting a bit in the preempt bit vector corresponding to the preempted execution entity.

17. The method according to claim 16, wherein the method further comprises the step of executing an execution entity selected from the execution entities determined runnable during the reading step; and wherein the step of executing includes the steps of:

loading state associated with the selected execution entity; and marking a bit in the preempt bit vector corresponding to the selected execution entity to indicate that the selected execution entity has been restored.

18. The method according to claim 13 wherein the step of reading further includes the step of caching the preempt bit vector.

19. In a computing system having a processor and a memory, wherein the processor operates within both a user mode and a protected kernel mode and wherein the processor is executing, in user mode, one of a plurality of threads from a multi-threaded application, wherein the multi-threaded application includes a user level scheduler and wherein the plurality of threads includes a first and a second thread, a method of switching from the first to the second thread, the method comprising the steps of:

forming a preempt bit vector, wherein the preempt bit vector includes a plurality of rbits, wherein the plurality of rbits includes a first rbit associated with the first thread and a second rbit associated with the second thread;

storing state associated with the first thread;

marking the first rbit to indicate that the first thread has been preempted;

loading state associated with the second thread; and executing said second thread.

20. The method according to claim 19, wherein the step of loading state associated with the second thread includes the step of marking the second rbit to indicate that the second thread has been restored.

21. The method according to claim 19, wherein the step of loading state associated with the second thread includes the step of selecting the second thread from ready-to-run threads in a user-level run queue.

* * * * *

UNITED STATES PATENT AND TRADEMARK OFFICE
CERTIFICATE OF CORRECTION

PATENT NO. : 6,418,460 B1
DATED : July 9, 2002
INVENTOR(S) : Nawaf K. Bitar, Robert M. English and Rajagopal Ananthanarayanan It is certified that error appears in the above-identified patent and that said Letters Patent is hereby corrected as shown below:

Title page,
Item [56], OTHER PUBLICATIONS, second reference, delete "dictionary :" and insert -- dictionary: --, therefor.

Column 9,
Line 13, delete "." after "location".

Column 17,
Line 40, insert -- . -- after "thereof".

Signed and Sealed this

Twenty-second Day of July, 2003

JAMES E. ROGAN
*Director of the United States Patent and Trademark Office*